United States Patent
Watanabe et al.

(10) Patent No.: US 12,296,406 B2
(45) Date of Patent: May 13, 2025

(54) MANUFACTURING METHOD AND MANUFACTURING APPARATUS FOR JOINT BODY

(71) Applicant: KOBE STEEL, LTD., Hyogo (JP)

(72) Inventors: Kenichi Watanabe, Kobe (JP); Takayuki Kimura, Kobe (JP); Liang Chen, Fujisawa (JP); Masao Hadano, Fujisawa (JP); Reiichi Suzuki, Fujisawa (JP)

(73) Assignee: Kobe Steel, Ltd., Hyogo (JP)

( * ) Notice: Subject to any disclaimer, the term of this patent is extended or adjusted under 35 U.S.C. 154(b) by 87 days.

(21) Appl. No.: 16/637,264

(22) PCT Filed: Aug. 1, 2018

(86) PCT No.: PCT/JP2018/028930
§ 371 (c)(1),
(2) Date: Feb. 6, 2020

(87) PCT Pub. No.: WO2019/044347
PCT Pub. Date: Mar. 7, 2019

(65) Prior Publication Data
US 2020/0398376 A1    Dec. 24, 2020

(30) Foreign Application Priority Data
Aug. 31, 2017  (JP) .................................. 2017-167216

(51) Int. Cl.
*B23K 26/24* (2014.01)
*B23K 26/08* (2014.01)
(Continued)

(52) U.S. Cl.
CPC .......... *B23K 26/24* (2013.01); *B23K 26/0846* (2013.01); *B23K 26/211* (2015.10);
(Continued)

(58) Field of Classification Search
CPC .. B23K 26/24; B23K 26/211; B23K 37/0461; B23K 2103/04; B23K 2101/006;
(Continued)

(56) References Cited

U.S. PATENT DOCUMENTS 4,745,257 A * 5/1988 Rito ....................... B23K 26/16
                                                    219/121.64
5,216,220 A * 6/1993 Davis .................... B23K 26/60
                                                    219/121.63
(Continued)

FOREIGN PATENT DOCUMENTS

JP  H04-258391 A     9/1992
JP  H10216974 A  *  8/1998  ............. B23K 26/21
(Continued)

OTHER PUBLICATIONS

Machine English Translation of JP-2000107876-A (Year: 2000).*
(Continued)

*Primary Examiner* — Helena Kosanovic
*Assistant Examiner* — Erwin J Wunderlich
(74) *Attorney, Agent, or Firm* — Studebaker Brackett PLLC

(57) ABSTRACT

Provided is a manufacturing method for a joint body having a blank material plated with a metal material and a hoop material plated with a metal material joined together by placing the hoop material on the blank material and causing a laser oscillation system to irradiate a surface of the hoop material with laser light to form a joint portion including a line-shaped welded portion where the blank material and the hoop material are joined together. In this manufacturing method, the hoop material is supplied to be placed on the blank material and form a predetermined gap d between the blank material and the hoop material, and the hoop material is irradiated with a laser at a position where the predeter- (Continued)

mined gap d is located between the blank material and the hoop material to join the blank material and the hoop material together by laser welding.

4 Claims, 19 Drawing Sheets

(51) Int. Cl.
| | |
|---|---|
| *B23K 26/211* | (2014.01) |
| *B23K 26/244* | (2014.01) |
| *B23K 26/322* | (2014.01) |
| *B23K 37/04* | (2006.01) |
| *B23K 103/04* | (2006.01) |
| *B41J 11/04* | (2006.01) |
| *B41J 13/02* | (2006.01) |
| *B23K 101/00* | (2006.01) |
| *B23K 101/18* | (2006.01) |
| *B23K 101/34* | (2006.01) |

(52) U.S. Cl.
CPC .......... *B23K 26/244* (2015.10); *B23K 26/322* (2013.01); *B23K 37/0426* (2013.01); *B23K 37/0435* (2013.01); *B23K 37/0461* (2013.01); *B41J 11/04* (2013.01); *B41J 13/02* (2013.01); *B23K 2101/006* (2018.08); *B23K 2101/18* (2018.08); *B23K 2101/34* (2018.08); *B23K 2103/04* (2018.08)

(58) Field of Classification Search
CPC .............. B23K 26/244; B23K 26/0846; B23K 26/322; B23K 2101/34; B23K 2101/18; B23K 37/0426; B23K 37/0435; B23K 2101/16; B23K 26/0884; B23K 26/26; B23K 37/0408; B23K 26/082; B23K 26/282; B62D 25/04; B41J 11/04; B41J 13/02
USPC ...................................... 219/121.64
See application file for complete search history.

(56) References Cited

U.S. PATENT DOCUMENTS

| | | | | |
|---|---|---|---|---|
| 5,539,180 A * | 7/1996 | Mori | ................... | B23K 26/125 |
| | | | | 219/121.64 |
| 6,002,098 A * | 12/1999 | Pircher | ................. | B23K 20/04 |
| | | | | 219/121.64 |
| 6,060,681 A * | 5/2000 | Bachhofer | ........... | B23K 26/037 |
| | | | | 219/78.15 |
| 6,528,756 B2 * | 3/2003 | Degawa | ............... | B23K 33/004 |
| | | | | 219/121.64 |
| 6,590,180 B1 * | 7/2003 | Suh | ........................ | B23K 26/26 |
| | | | | 219/161 |
| 6,703,583 B2 * | 3/2004 | Menin | ................ | B23K 37/0408 |
| | | | | 219/121.64 |
| 6,932,879 B2 * | 8/2005 | Ely | ....................... | B23K 26/323 |
| | | | | 148/516 |
| 7,319,205 B2 * | 1/2008 | Oda | ..................... | B23K 26/244 |
| | | | | 219/121.64 |
| 10,850,354 B2 * | 12/2020 | Fujiwara | ............ | B23K 26/0884 |
| 11,117,216 B2 * | 9/2021 | Nakao | .................. | B23K 26/322 |
| 2001/0047983 A1 | 12/2001 | Degawa et al. | | |
| 2005/0230371 A1 * | 10/2005 | Kutsuna | ............... | B23K 26/037 |
| | | | | 219/121.64 |
| 2007/0029293 A1 * | 2/2007 | Oda | ..................... | B23K 26/244 |
| | | | | 219/121.64 |
| 2007/0272665 A1 * | 11/2007 | Becker | ................... | B23K 26/60 |
| | | | | 219/121.64 |
| 2009/0283504 A1 * | 11/2009 | Matsuo | .............. | B65H 19/1836 |
| | | | | 219/121.64 |
| 2009/0314750 A1 * | 12/2009 | Saitoh | .................. | B23K 26/282 |
| | | | | 219/121.64 |
| 2010/0129684 A1 * | 5/2010 | Nakagawa | ........... | B23K 26/211 |
| | | | | 219/148 |
| 2011/0168682 A1 * | 7/2011 | Hagihara | ............. | B23K 26/244 |
| | | | | 219/121.64 |
| 2014/0076866 A1 * | 3/2014 | Gramsch | ................ | B23K 26/24 |
| | | | | 219/121.64 |
| 2015/0352672 A1 * | 12/2015 | Kinoshita | .............. | B23K 26/34 |
| | | | | 219/121.64 |
| 2016/0368084 A1 * | 12/2016 | Henneke | .............. | B23K 26/042 |
| 2018/0111226 A1 * | 4/2018 | Wang | ................ | B23K 26/0869 |
| 2018/0221989 A1 * | 8/2018 | Matsuoka | ............ | B23K 26/082 |
| 2019/0126387 A1 * | 5/2019 | Fux | ....................... | B23K 26/323 |

FOREIGN PATENT DOCUMENTS

| | | | | |
|---|---|---|---|---|
| JP | 2000107876 A | * | 4/2000 | ......... B23K 26/0604 |
| JP | 2004-025219 A | | 1/2004 | |
| WO | WO-2016172976 A1 | * | 11/2016 | ......... B23K 26/0869 |

OTHER PUBLICATIONS

Machine English Translation of JP-H10216974-A (Year: 1998).*
International Preliminary Report on Patentability and Written Opinion issued in PCT/JP2018/028930; mailed Mar. 12, 2020.
International Search Report issued in PCT/JP2018/028930; mailed Oct. 16, 2018.

* cited by examiner

MANUFACTURING METHOD AND MANUFACTURING APPARATUS FOR JOINT BODY

CROSS-REFERENCE TO RELATED APPLICATIONS

This is a national phase application in the United States of International Patent Application No. PCT/JP2018/028930 with an international filing date of Aug. 1, 2018, which claims priority of Japanese Patent Application No. 2017-167216 filed on Aug. 31, 2017 the contents of which are incorporated herein by reference.

TECHNICAL FIELD

The present invention relates to a manufacturing method and manufacturing apparatus for a joint body.

BACKGROUND ART

A metal member such as a galvanized steel plate resulting from plating a surface of a metal plate is used in various structures. For example, in a structure such as an automobile, the galvanized steel plate that is waterproof is often used as an outer plate or the like.

Such a plated metal member is used in various applications. When used as a part of a structure, the plated metal member needs to be joined to another structural member by welding or the like. When the plated metal member is welded to another structural member, a component of the plated layer may be melted and evaporated by welding heat, and this component-evaporated gas may be trapped in a welded portion. In such a case, the component-evaporated gas thus trapped in the welded portion blows out, and as a result, a defective hole called a blowhole is formed in the welded portion.

JP 2001-276991 A discloses a lap laser welded structure made of two plated steel plates that are laser-welded with at least one of the two plated steel plates separated to form a gas discharge path. In this structure, making one of the plated steel plates embossed causes the two plated steel plates to separate from each other to form the gas discharge path at a site close to a welding line. Therefore, during laser welding, the component-evaporated gas generated from the plated layer on a joint surface is discharged to the outside through the gas discharge path to prevent the occurrence of a blowhole.

However, for the laser welded structure disclosed in JP 2001-276991 A, since it is necessary to make the plated steel plate embossed, the number of processes is increased compared to normal welding. Further, since it is necessary to make the plated steel plate embossed in advance, it is unsuitable for continuous welding on a continuous plate material It is therefore an object of the present invention to prevent the occurrence of a blowhole by a simple method without increasing the number of processes in a manufacturing method and manufacturing apparatus for a joint body having plated metal members joined together.

According to a first aspect of the present invention, provided is a manufacturing method for a joint body having a first metal member plated with a metal material and a second metal member plated with a metal material joined together by placing the second metal member on the first metal member and causing a laser oscillation system to irradiate a surface of the second metal member with laser light to form a joint portion including a line-shaped welded portion where the first metal member and the second metal member are joined together, the manufacturing method including supplying the second metal member to place the second metal member on the first metal member and form a predetermined gap between the first metal member and the second metal member, and irradiating the second metal member with a laser at a position where the predetermined gap is located between the first metal member and the second metal member to join the first metal member and the second metal member together by laser welding.

According to this manufacturing method, the first metal member and the second metal member are joined together by laser welding with the predetermined gap provided in a thickness direction, thereby allowing the component-evaporated gas generated from the plated layer to be released through the gap. At this time, since the first metal member is supplied to form the predetermined gap between the first metal member and the second metal member, it is not necessary to apply special processing such as embossing to form a gap when the first metal member and the second metal member are placed on top of each other in a conventional manner. That is, even when both the first metal member and the second metal member are flat plate materials, the component-evaporated gas can be released. Note that a specific aspect of supplying the first metal member to form the predetermined gap will be described later. Therefore, it is possible to prevent the occurrence of a blowhole by a simple method without increasing the number of processes and in turn makes it possible to prevent the occurrence of a defect in the joint body. Herein, the predetermined gap refers to a gap having a length that allows the first metal member and the second metal member to be joined by laser welding while allowing the component-evaporated gas to be released. That is, when this gap is too small, the component-evaporated gas may fail to be released, and when this gap is too large, the first metal member and the second metal member may fail to be welded together.

According to a second aspect of the present invention, provided is a manufacturing apparatus for a joint body having a first metal member plated with a metal material and a second metal member plated with a metal material joined together by placing the second metal member on the first metal member and causing a laser oscillation system to irradiate a surface of the second metal member with laser light to form a joint portion including a line-shaped welded portion where the first metal member and the second metal member are joined together, the manufacturing apparatus including a support table configured to hold the first metal member, a supplying unit configured to supply the second metal member while pressing the second metal member against the first metal member held on the support table at a predetermined angle with no relative movement of the second metal member to the first metal member in an in-plane direction of the first metal member, the laser oscillation system configured to emit a laser to weld the first metal member and the second metal member together, and an irradiation position motion unit configured to cause the laser oscillation system to irradiate the second metal member with the laser at a position where a gap is formed between the first metal member and the second metal member.

According to a third aspect of the present invention, provided is a manufacturing apparatus for a joint body having a first metal member plated with a metal material and a second metal member plated with a metal material joined together by placing the second metal member on the first metal member and causing a laser oscillation system to irradiate a surface of the second metal member with laser light to form a joint portion including a line-shaped welded portion where the first metal member and the second metal member are joined together, the manufacturing apparatus including a support table configured to hold the first metal member, a supplying unit configured to supply the second metal member onto the first metal member held on the support table with no relative movement of the second metal member to the first metal member in an in-plane direction of the first metal member, an interposing device configured to allow the second metal member to be supplied with a spacer interposed between the first metal member and the second metal member, the laser oscillation system configured to emit a laser to weld the first metal member and the second metal member together, and an irradiation position motion unit configured to cause the laser oscillation system to irradiate the second metal member with the laser at a position where a gap is formed between the first metal member and the second metal member.

According to the present invention, in the manufacturing method and manufacturing apparatus for a joint body having plated plate materials joined together, since the first metal member is supplied to form a predetermined gap between the first metal member and the second metal member, it is possible to join the first metal member and the second metal member together by laser welding with the predetermined gap provided in the thickness direction. This allows, even when both the first metal member and the second metal member are flat plate materials, the component-evaporated gas generated from the plated layer to be released through this gap and in turn makes it possible to prevent the occurrence of a blowhole by a simple method without increasing the number of processes.

MODE FOR CARRYING OUT THE INVENTION

First Embodiment

A description will be given below of a first embodiment of the present invention with reference to FIG. 1 to FIG. 16B.

(Joint Body)

Figure 1:
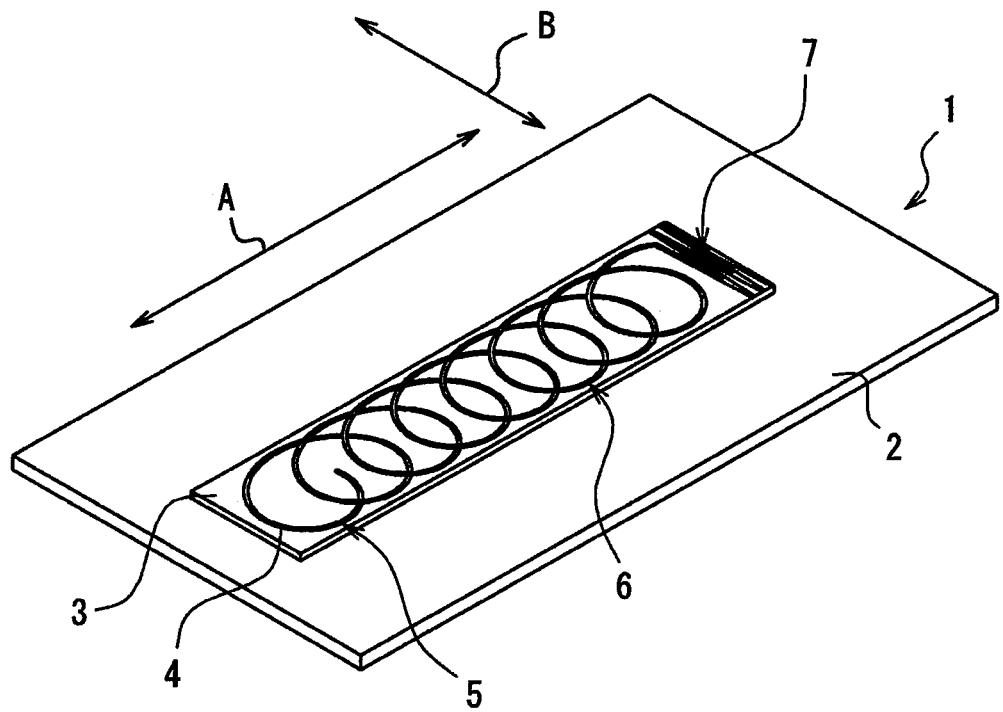
FIG. 1 is a perspective view of an example of a joint body manufactured by a manufacturing apparatus according to a first embodiment of the present invention.
Figure 2:
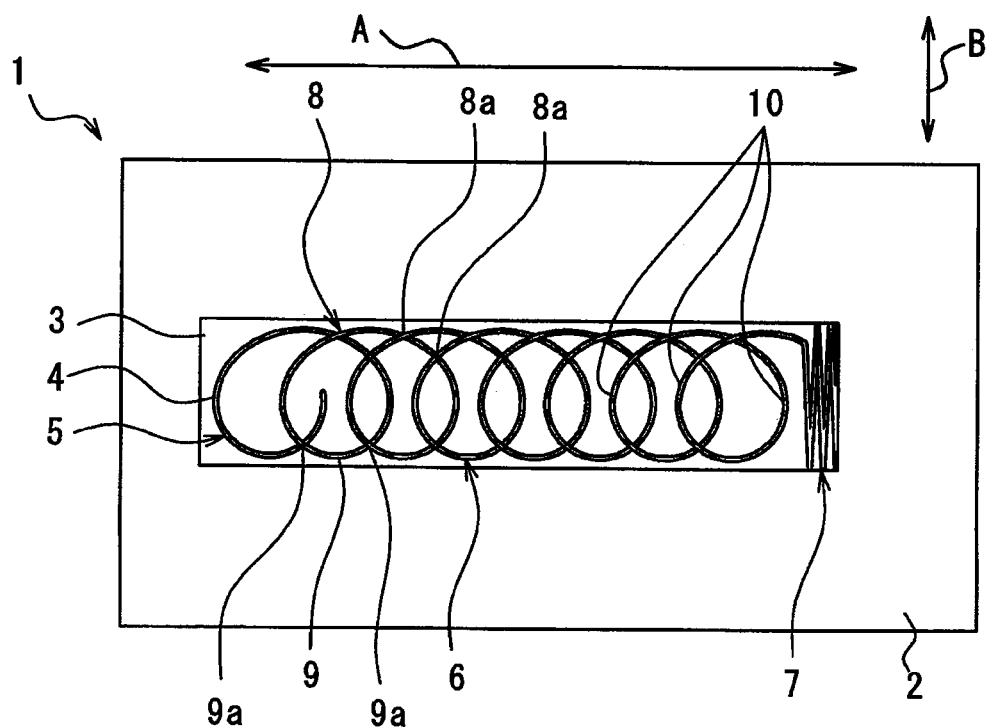
FIG. 2 is a plan view of the example of the joint body manufactured by the manufacturing apparatus according to the first embodiment of the present invention.

FIG. 1 and FIG. 2 show a joint body 1 manufactured by a manufacturing apparatus (FIG. 4 and FIG. 5) according to the first embodiment of the present invention.

The joint body 1 shown in FIG. 1 and FIG. 2 includes a blank material 2 (first metal member) that is an example of a galvanized steel plate and a reinforcing material 3 (second metal member) that is also an example of a galvanized steel plate. According to the present embodiment, the reinforcing material 3 is narrower than the blank material 2, and the reinforcing material 3 and the blank material 2 have a thickness of about 2 mm, for example. However, the blank material 2 and the reinforcing material 3 need not necessarily be galvanized steel plates and may be metal members plated with a metal material. Examples of such metal materials used for plating include aluminum, gold, silver, copper, tin, nickel, and chromium. For example, the metal member to be plated may be an aluminum alloy or a titanium alloy.

The reinforcing material 3 is placed on the blank material 2 and fixed to the blank material 2 by laser welding. The joint body 1 includes a joint portion 5 formed by one streak of continuous welding mark or welded portion 4, along which the blank material 2 and the reinforcing material 3 are joined together. The joint portion 5 shown in FIG. 1 and FIG. 2 is merely an example, and, as will be described later with reference to FIG. 8A to FIG. 16B, the specific form of the joint portion 5 includes various alternatives.

The joint portion 5 includes a main body 6 and an end portion 7.

According to the present embodiment, the welded portion 4 in the main body 6 of the joint portion 5 has a curved shape having a periodic repetitive pattern and includes a first longitudinal portion 8, a second longitudinal portion 9, and a plurality of connecting portions 10 having a curved shape. In the first longitudinal portion 8, a plurality of intersecting portions 8a (first intersecting portions) where the welded portion 4 intersects itself are arranged in one direction A (first direction) in plan view, and the first longitudinal portion 8 itself extends in the direction A. The direction A coincides with a welding direction (see a symbol WD in FIG. 4, for example) to be described later and a direction opposite to the welding direction. The second longitudinal portion 9 is located apart from the first longitudinal portion 8 in a direction B orthogonal to the direction A in plan view. In the second longitudinal portion 9, as with the first longitudinal portion 8, a plurality of intersecting portions 9a (second intersecting portions) where the welded portion 4 intersects itself are arranged in the direction A in plan view, and the second longitudinal portion 9 itself extends in the direction A. The plurality of connecting portions 10 are arranged at intervals in the direction A, each of the connecting portions 10 extends in the direction B, and both ends of each of the connecting portions 10 are connected to the first longitudinal portion 8 and the second longitudinal portion 9. According to the present embodiment, the first longitudinal portion 8, the second longitudinal portion 9, and the plurality of connecting portions 10 form a ladder structure in plan view.

At the end portion 7 of the joint portion 5, the welded portion 4 has a zigzag shape or a folded-line shape that extends forward and backward, at close intervals, between the first longitudinal portion 8 and the second longitudinal portion 9. As will be described later with reference to FIG. 20, the joint portion 5 may include only the main body 6 without the end portion 7.

In the main body 6 of the joint portion 5, the welded portion 4 having a line shape continuously extends in two directions orthogonal to each other, that is, in both the directions A, B, in plan view. In other words, in the main body 6 of the joint portion 5, the welded portion 4 having a line shape is provided extending two-dimensionally, that is, in a planar form. Such a structure allows at least one streak of welded portion 4 to be present in plan view within a region having a certain area in the main body 6 of the joint portion 5. In particular, within small regions near the intersecting portions 8a of the first longitudinal portion 8 and the intersecting portions 9a of the second longitudinal portion 9, a plurality of streaks of welded portions 4 are present. The main body 6 of the joint portion 5 having such a structure makes it possible to sufficiently increase the joint strength between the blank material 2 and the reinforcing material 3. For example, when two members are joined together by spot welding, the welded portion includes a plurality of scattered spots. Further, the welded portion made even by laser welding may include one or a plurality of pairs of parallel straight lines, or may include a plurality of C-shaped portions arranged in a row and adjacent to each other. Compared to any of the above structures, the main body 6 of the joint portion 5 in which the welded portion having a line shape continuously extends in both the directions A, B shown in FIG. 1 and FIG. 2 makes it possible to join the blank material 2 and the reinforcing material 3 with higher joint strength.

Figure 3A:
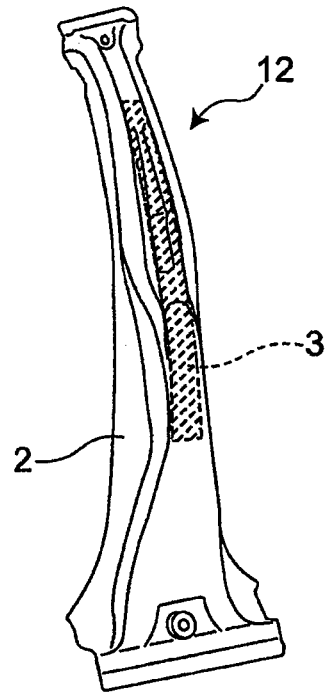
FIG. 3A is a perspective view of a B pillar manufactured by processing a joint body by hot stamping.
Figure 3B:
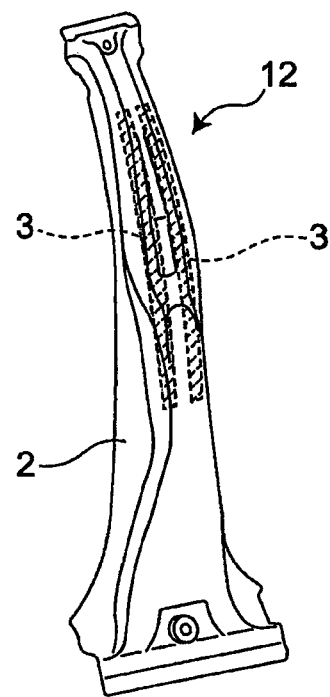
FIG. 3B is a perspective view of another example of the B pillar manufactured by processing the joint body by hot stamping.

Since the blank material 2 and the reinforcing material 3 are joined together with sufficient joint strength, the joint body 1 is suitable for processing by hot stamping, and it is thus possible to increase strength of a produced vehicle frame component against collision. For example, FIG. 3A shows an example of a B pillar 12 (an example of the vehicle frame component) manufactured by processing the joint body 1 by hot stamping. In this example, one sheet of reinforcing material 3 is joined to the blank material 2. The B pillar 12 is produced by a method in which the reinforcing material 3 is welded only to a portion of the blank material 2 that needs to be reinforced (see a portion represented by oblique broken lines) so as to have the joint portion 5 shown in FIG. 1 and FIG. 2 and then molded integrally with the blank material 2 by hot stamping. FIG. 3B shows another example of the B pillar 12 manufactured by processing the joint body 1 by hot stamping. In this example, two reinforcing members 3 are joined to the blank material 2, and each of the reinforcing materials 3 is joined to a ridge line portion formed by hot stamping.

In order to sufficiently increase the joint strength between the blank material 2 and the reinforcing material 3, it is preferable that, in the main body 6 of the joint portion 5, at least one streak of welded portion 4 passes through a square region whose side is 2 cm long, for example.

(Manufacturing Apparatus and Manufacturing Method for Joint Body)

Figure 4:
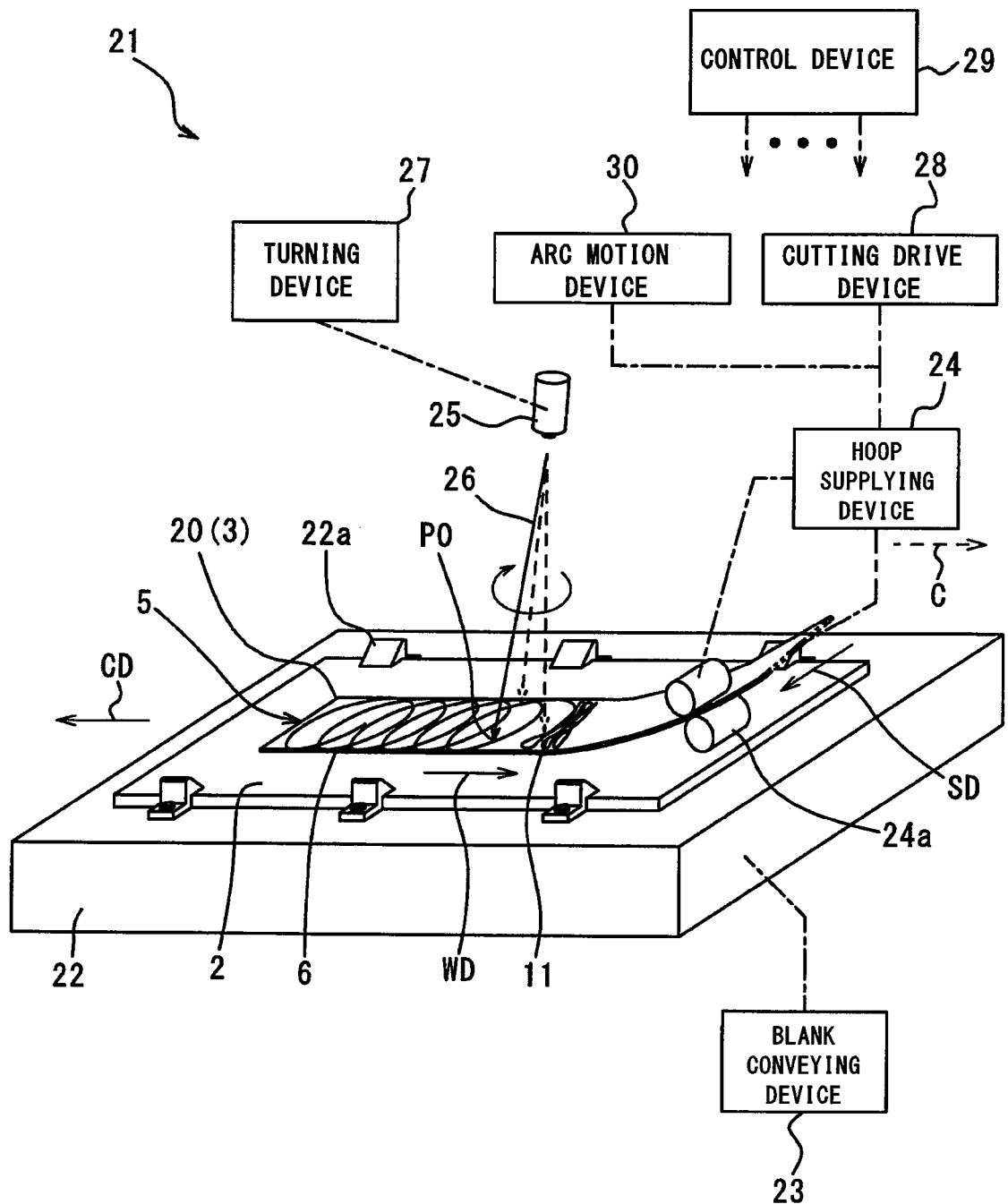
FIG. 4 is a schematic perspective view of the manufacturing apparatus for the joint body according to the first embodiment of the present invention.
Figure 5:
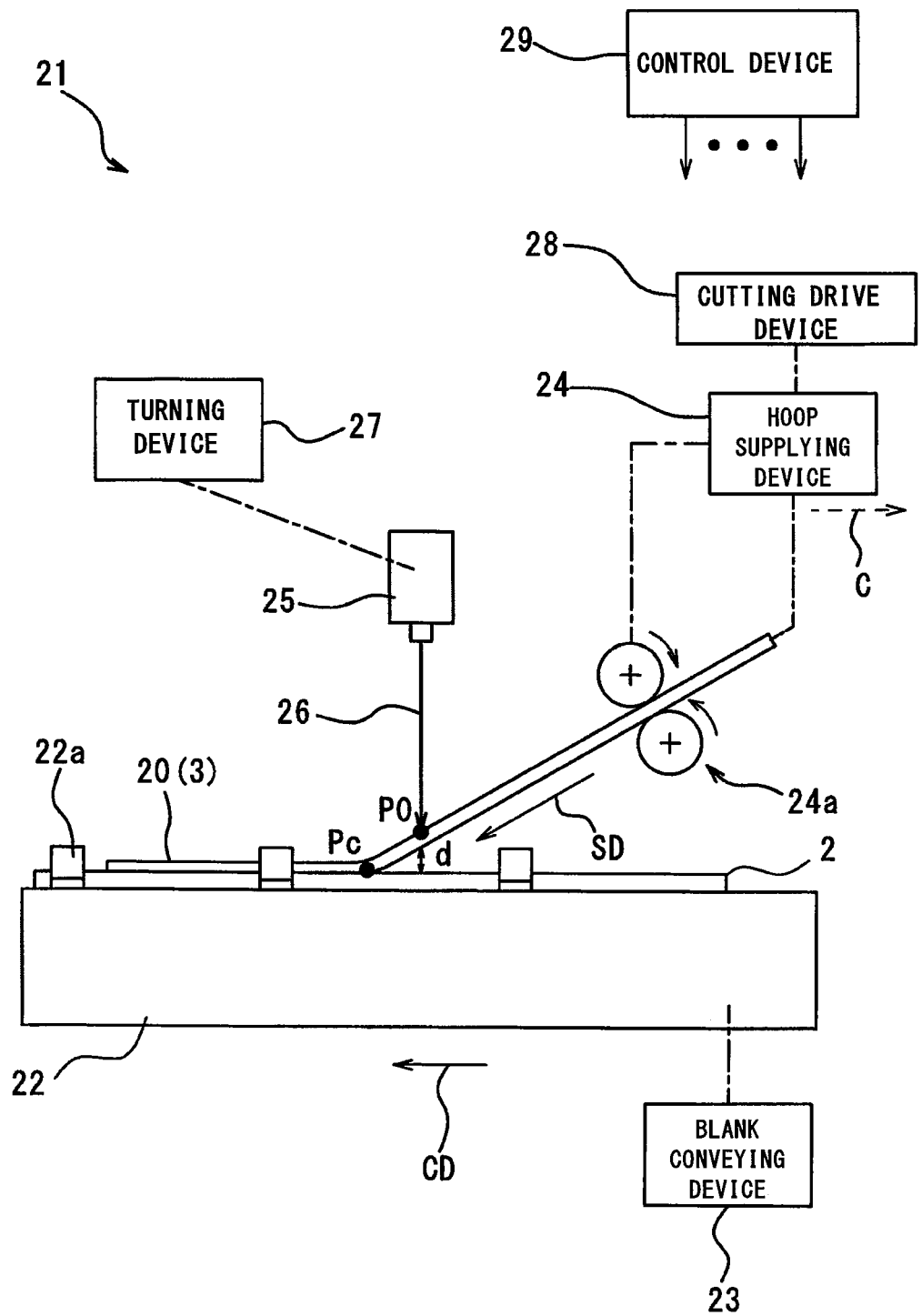
FIG. 5 is a schematic side view of the manufacturing apparatus for the joint body according to the first embodiment of the present invention.

FIG. 4 and FIG. 5 show a manufacturing apparatus 21 for the joint body 1 shown in FIG. 1 and FIG. 2. As will be described later with reference to FIG. 8A to FIG. 16B, the manufacturing apparatus 21 is also capable of manufacturing a joint body 1 that is different in structure of the joint portion 5 from the joint body 1 shown in FIG. 1 and FIG. 2.

The manufacturing apparatus 21 includes a table (support table) 22 on which the blank material 2 is detachably held by a fixture 22a. A blank conveying device 23 moves the table 22 and the blank material 2 held on the table 22 at a constant speed in a conveying direction CD opposite to the welding direction WD.

The manufacturing apparatus 21 includes a hoop supplying device 24. The hoop supplying device 24 (supplying unit) includes a supplying roll pair 24a. The hoop supplying device 24 unwinds a hoop material 20 wound in a coil shape (that becomes the reinforcing material 3 when the joint body 1 is completed) with the supplying roll pair 24a to supply the hoop material 20 onto the blank material 2 held on the table 22. More specifically, the hoop supplying device 24 continuously supplies the hoop material 20 thus unwound in a supplying direction SD that coincides with the conveying direction CD of the blank material 2 while pressing the hoop material 20 against the blank material 2 obliquely from above at a predetermined angle. The predetermined angle will be described later. At this time, as will be described later, the hoop material 20 is supplied onto the blank material 2 with a predetermined gap d formed between the hoop material 20 and the blank material 2. That is, the hoop material 20 is supplied so as to come into contact with the blank material 2 successively from a supply forward side (left side in FIG. 5) to a near side (right side in FIG. 5), and the hoop material 20 is in contact with the blank material 2 on the supply forward side relative to a contact point Pc and is not in contact with the blank material 2 on a supply near side relative to the contact point Pc. Herein, the predetermined gap d refers to a gap having a length that allows the blank material 2 and the hoop material 20 to be joined together by laser welding while allowing a component-evaporated gas to be released. That is, when this gap is too small, the component-evaporated gas may fail to be released, and when this gap is too large, the blank material 2 and the hoop material 20 may fail to be welded together. The predetermined gap d satisfying these conditions is preferably in a range of about 0.1 mm to 0.4 mm. As in the present embodiment, when the blank material 2 that is a galvanized steel plate having a thickness of about 2 mm and the hoop material 20 having the same thickness and the same material as the blank material 2 are joined together by laser welding, the predetermined gap d is, for example, about 0.2 mm. A supplying speed of the blank material 2 supplied by the hoop supplying device 24 is synchronized with a conveying speed of the blank material 2 conveyed by the blank conveying device 23. Therefore, the hoop material 20 is stationary on the blank material 2 relative to the blank material 2 in an in-plane direction of the blank material 2. Further, it is also possible to supply not only a continuous body wound in a hoop shape or a coil shape, but also a band material cut in advance to a length of the reinforcing material 3 (second metal member).

The manufacturing apparatus 21 includes a laser oscillation system 25. The laser oscillation system 25 includes components necessary for generating laser light, such as a laser oscillation element, a drive circuit, and an optical system. Laser light 26 emitted downward from the laser oscillation system 25 is projected onto an upper surface of the hoop material 20 at a position immediately before the hoop material 20 is pressed against the blank material 2 by the hoop supplying device 24 (in particular, see FIG. 5). In other words, the laser light 26 is projected onto the hoop material 20 at a position where the predetermined gap d is located between the blank material 2 and the hoop material 20. Specifically, the laser light 26 is projected onto the hoop material 20 on the near (supply near) side relative to a side where the hoop material 20 is in contact with the blank material 2, that is, on the right side relative to the contact point Pc in FIG. 5. In FIG. 4 and FIG. 5, a symbol P0 denotes an irradiation position of the laser light 26. According to the present embodiment, the laser oscillation system 25 does not move in horizontal and vertical directions.

The manufacturing apparatus 21 includes a turning device 27 (irradiation direction changing unit). The turning device 27 periodically changes an irradiation direction of the laser light 26 emitted from the laser oscillation system 25. As will be described in detail later, assuming that the laser oscillation system 25 is not in motion in the welding direction WD relative to the blank material 2 and the hoop material 20, the turning device 27 periodically changes the irradiation direction of the laser light 26 to move a virtual irradiation position P1 (see FIG. 6A) along a closed figure (a circle as will be described later, according to the present embodiment). In the present embodiment, the blank conveying device 23 and the turning device 27 serve as an irradiation position motion unit according to the present invention.

The manufacturing apparatus 21 includes a cutting drive device 28. As will be described in detail later, the cutting drive device 28 cuts the hoop material 20 by moving, after the hoop material 20 is welded to the blank material 2, the hoop supplying device 24 in the welding direction WD as indicated by an arrow C to apply tension to the hoop material 20. Note that, as described above, a configuration where the band material cut in advance to the length of the reinforcing material 3 (second metal member) is used eliminates the need for the cutting drive device 28.

A control device 29 controls, in a centralized manner, operations of various components of the manufacturing apparatus 21 including the blank conveying device 23, the hoop supplying device 24, the laser oscillation system 25, the turning device 27, and the cutting drive device 28.

A description will be given below of an operation of the manufacturing apparatus 21, that is, a manufacturing method for the joint body 1 performed by the manufacturing apparatus 21.

The irradiation direction of the laser light 26 emitted from the laser oscillation system 25 is periodically changed by the turning device 27. Further, the blank material 2 is moved in the conveying direction CD by the blank conveying device 23, and the hoop material 20 is continuously supplied from the hoop supplying device 24 in the supplying direction SD that coincides with the conveying direction CD. The movements of the blank material 2 and the hoop material 20 cause the laser oscillation system 25 to move relative to the blank material 2 and the hoop material 20 in the welding direction WD (opposite to the conveying direction CD and the supplying direction SD). The periodical change of the irradiation direction of the laser light 26 and the movement of the laser oscillation system 25 in the welding direction WD relative to the blank material 2 and the hoop material 20 change an irradiation position P0 of the laser light 26 on the upper surface of the hoop material 20. As a result, as described above, the main body 6 of the joint portion 5 including the first longitudinal portion 8, the second longitudinal portion 9, and the plurality of connecting portions 10 is obtained.

Figure 6A:
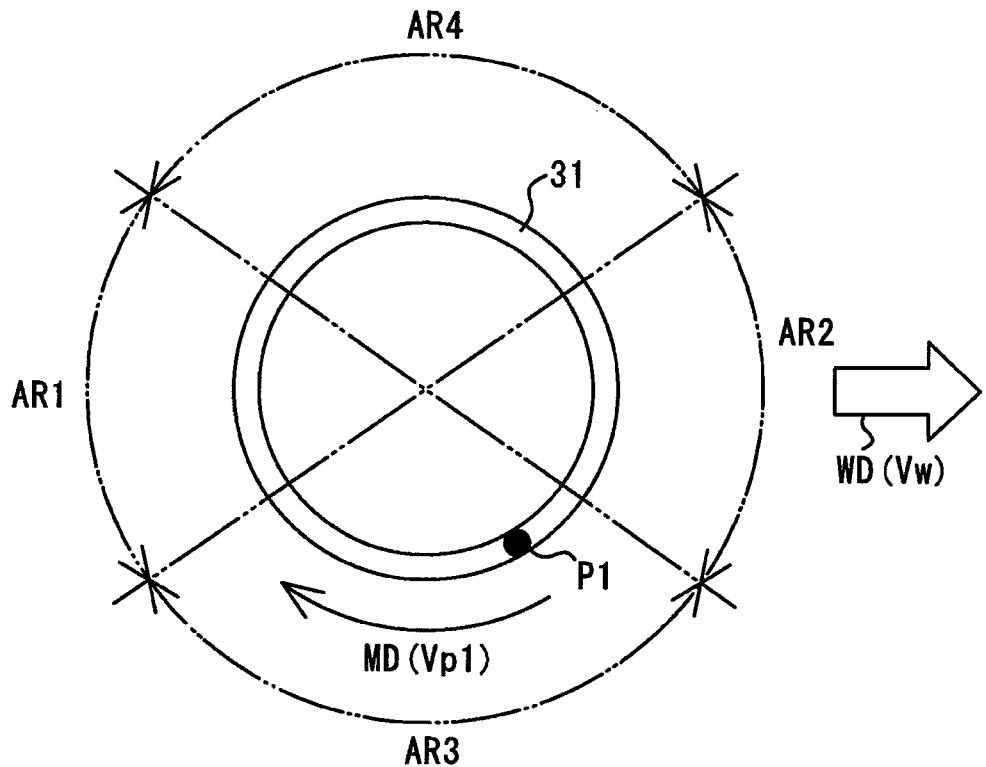
FIG. 6A is a schematic plan view showing an example of an irradiation pattern of laser light.

FIG. 6A shows an irradiation pattern 31 of the laser light 26 according to the present embodiment. The irradiation pattern 31 is a closed figure along which the virtual irradiation position P1 of the laser light 26 moves assuming that the laser oscillation system 25 is not in motion in the welding direction WD relative to the blank material 2 and the hoop material 20. The irradiation pattern 31 according to the present embodiment has a circular shape. The irradiation pattern 31 is obtained by causing the turning device 27 to periodically change the irradiation direction of the laser light 26 emitted from the laser oscillation system 25. In FIG. 6A, a symbol MD denotes a direction in which the virtual irradiation position P1 moves on the irradiation pattern 31 according to the present embodiment.

Figure 6B:
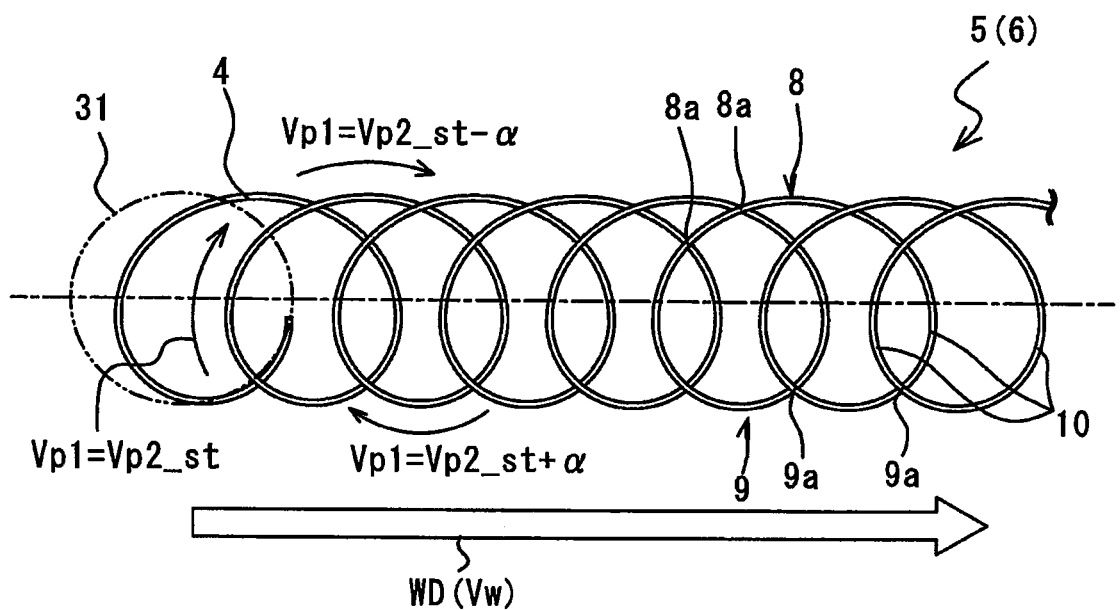
FIG. 6B is a schematic plan view showing an example of a joint portion obtained based on the irradiation pattern shown in FIG. 6A.

FIG. 6B shows the main body 6 of the joint portion 5 obtained based on the irradiation pattern 31 having a circular shape shown in FIG. 6A. In general, the shape of the main body 6 of the joint portion 5 is determined based on a geometric shape of the irradiation pattern 31, a speed Vw at which the laser oscillation system 25 moves in the welding direction WD relative to the blank material 2 and the hoop material 20, and a speed Vp1 at which the virtual irradiation position P1 moves on the irradiation pattern 31 to be described later.

According to the present embodiment, the speed Vp1 at which the virtual irradiation position P1 moves on the irradiation pattern 31 is not constant. Specifically, for regions AR1, AR2 of the irradiation pattern 31 that extend approximately orthogonal to the welding direction WD, the speed Vp1 is set equal to a reference speed $Vp1\_st$ ($Vp1=Vp1\_st$). As the reference speed $Vp1\_st$, for example, an average of the speed Vp1 at which the virtual irradiation position P1 moves on the irradiation pattern 31 can be used. For a region AR3 of the irradiation pattern 31 where the virtual irradiation position P1 moves in the direction approximately opposite to the welding direction WD, the speed Vp1 at which the virtual irradiation position P1 moves is set equal to a speed resulting from adding a correction $\alpha$ ($\alpha$ is a positive number) to the reference speed $Vp1\_st$ ($Vp1=Vp1\_st+\alpha$). On the other hand, for a region AR4 of the irradiation pattern 31 where the virtual irradiation position P1 moves approximately in the welding direction WD, the speed Vp1 at which the virtual irradiation position P1 moves is set equal to a speed resulting from subtracting the correction $\alpha$ from the reference speed $Vp1\_st$ ($Vp1=Vp1\_st-\alpha$). As described above, controlling the speed Vp1 at which the virtual irradiation position P1 moves on the irradiation pattern 31 allows a speed Vr at which the irradiation position P0 moves on the main body 6 of the joint portion 5 to be maintained within a favorable speed range. That is, the speed Vr at which the irradiation position P0 moves on the main body 6 of the joint portion 5 is made uniform. As a result, an excellent main body 6 of the joint portion 5 having a uniform depth, width, and the like can be obtained.

The hoop supplying device 24 supplies the hoop material 20 unwound while pressing the hoop material 20 against the blank material 2 obliquely from above. The supplying direction SD of the hoop material 20 supplied from the hoop supplying device 24 coincides with the conveying direction CD of the blank material 2, and the supplying speed of the hoop material 20 coincides with the conveying speed of the blank material 2. That is, relative positions of the blank material 2 and the hoop material 20 do not move. Accordingly, the hoop material 20 can be fixed to the blank material 2 by the laser light 26 emitted from the laser oscillation system 25 without being temporarily fixed by a clamp using a fixture or the like. Further, since this eliminates the need for a fixture or the like, the entire surface of the hoop material 20 can be irradiated with the laser light 26. That is, the main body 6 of the joint portion 5 can be formed on the entire surface of the hoop material 20.

Figure 7:
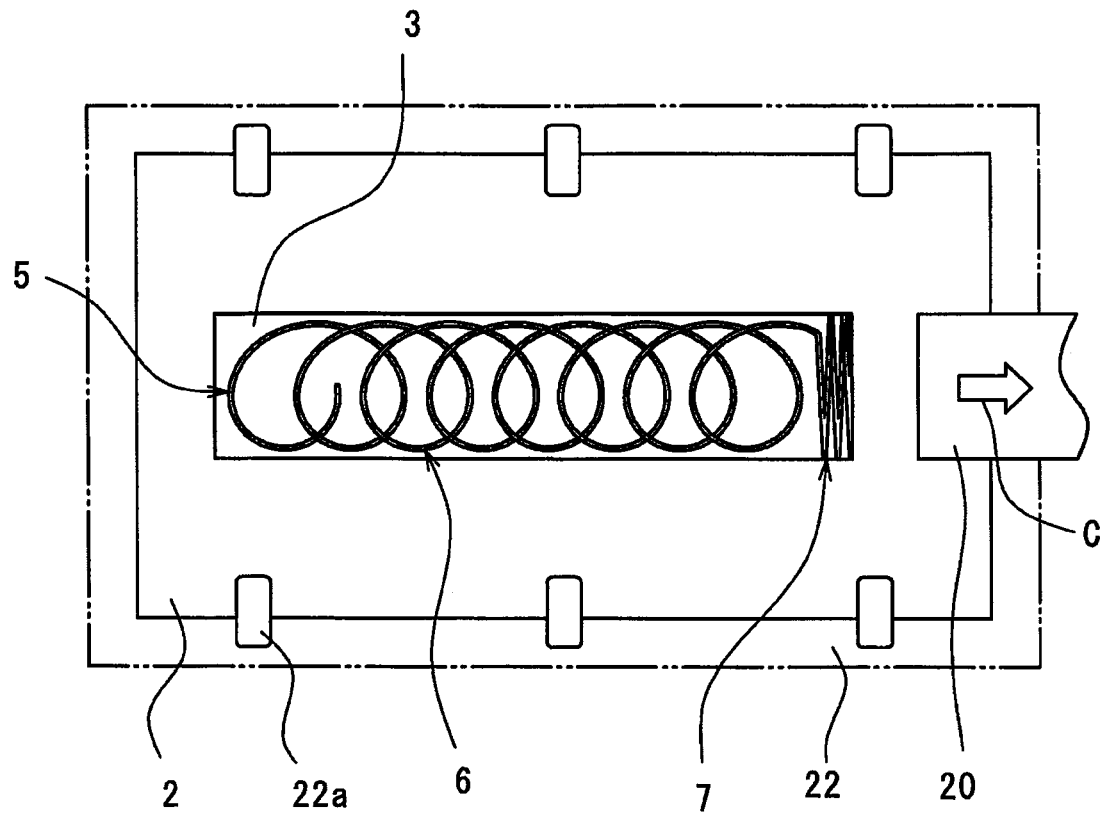
FIG. 7 is a schematic plan view for describing a cutting process.

As shown in FIG. 7, after the main body 6 of the joint portion 5 having a necessary length is obtained, the hoop material 20 that is continuous and the blank material 2 are cut. When the hoop material 20 is cut, the virtual irradiation position 21 is repeatedly moved forward and backward in a direction orthogonal to the welding direction WD without interruption of the conveyance of the blank material 2 and the supply of the hoop material 20. As a result, the irradiation position P0 of the laser light 26 moves forward and backward in a folded-line shape at close intervals in a width direction of the hoop material 20 (the direction orthogonal to the welding direction WD), thereby forming the end portion 7 of the joint portion 5. Since the welded portion 4 having a folded-line shape is densely located in the end portion 7, a molten pool before solidification reaches the vicinity of the lower surface of the blank material 2. Immediately after the irradiation with the laser light 26 is stopped, the cutting drive device 28 moves the hoop supplying device 24 in the direction indicated by the arrow C (the direction that coincides with the welding direction WD) to apply tension to the hoop material 20. This tension cuts the hoop material 20 at the end portion 7. Of the hoop material 20 thus cut, a portion joined to the blank material 2 along the joint portion 5 becomes the reinforcing material 3.

In order to continuously weld the reinforcing material 3 using the hoop material 20, it is necessary to cut the hoop material 20 every time the joint portion 5 is formed for each sheet of reinforcing material 3. According to the present embodiment, since tension is applied to the hoop material 20 by the cutting drive device 28 to cut the hoop material 20 after the formation of the end portion 7 where the welded portion 4 is densely located, it is not necessary to provide a mechanical cutting device such as a large cutter and in turn makes it possible to downsize the manufacturing apparatus 21. Note that means for applying tension to the hoop material 20 is not particularly limited to any specific means, and means such as a weight or a spring may be employed.

FIG. 8A, FIG. 9A, FIG. 10A, FIG. 11A, FIG. 12A, FIG. 13A, FIG. 14A, FIG. 15A, and FIG. 16A show alternatives of the irradiation patterns 31. FIG. 8B, FIG. 9B, FIG. 10B, FIG. 11B, FIG. 12B, FIG. 13B, FIG. 14B, FIG. 15B, and FIG. 16B each show the main body 6 of the joint portion 5 obtained based on a corresponding one of the irradiation patterns 31. In these drawings, the same or similar elements as shown in FIG. 6A and FIG. 6B are denoted by the same symbols.

For any of these alternative irradiation patterns 31, the control of the speed Vp1 at which the virtual irradiation position P1 moves on the irradiation pattern 31 described with reference to FIG. 6A can be performed. When this control is performed, the speed Vp1 is set equal to the reference speed $Vp1\_st$ for a region of the irradiation pattern 31 that extends approximately orthogonal to the welding direction WD. Further, for a region of the irradiation pattern 31 where the virtual irradiation position P1 moves in the direction approximately opposite to the welding direction WD, the speed Vp1 is set equal to a speed resulting from adding the correction $\alpha$ to the reference speed $Vp1\_st$ ($Vp1=Vp1\_st+\alpha$). Further, for a region of the irradiation pattern 31 where the virtual irradiation position P1 moves approximately in the welding direction WD, the speed Vp1 is set equal to a speed resulting from subtracting the correction $\alpha$ from the reference speed $Vp1\_st$ ($Vp1=Vp1\_st-\alpha$).

Figure 8A:
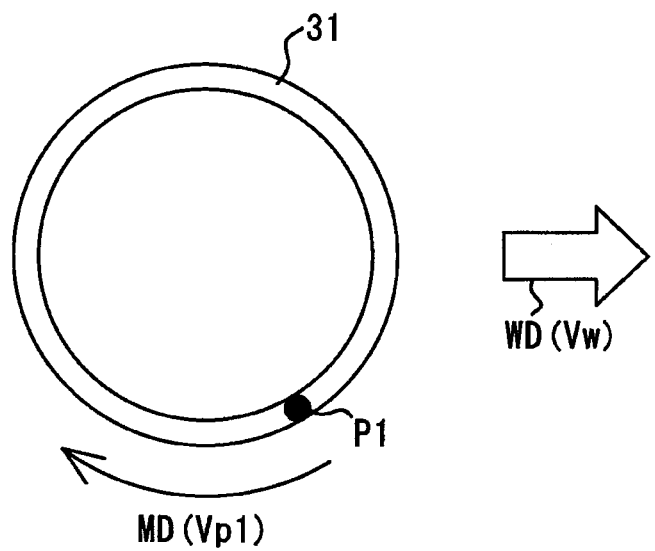
FIG. 8A is a schematic plan view showing a first alternative of the irradiation pattern of laser light.
Figure 8B:
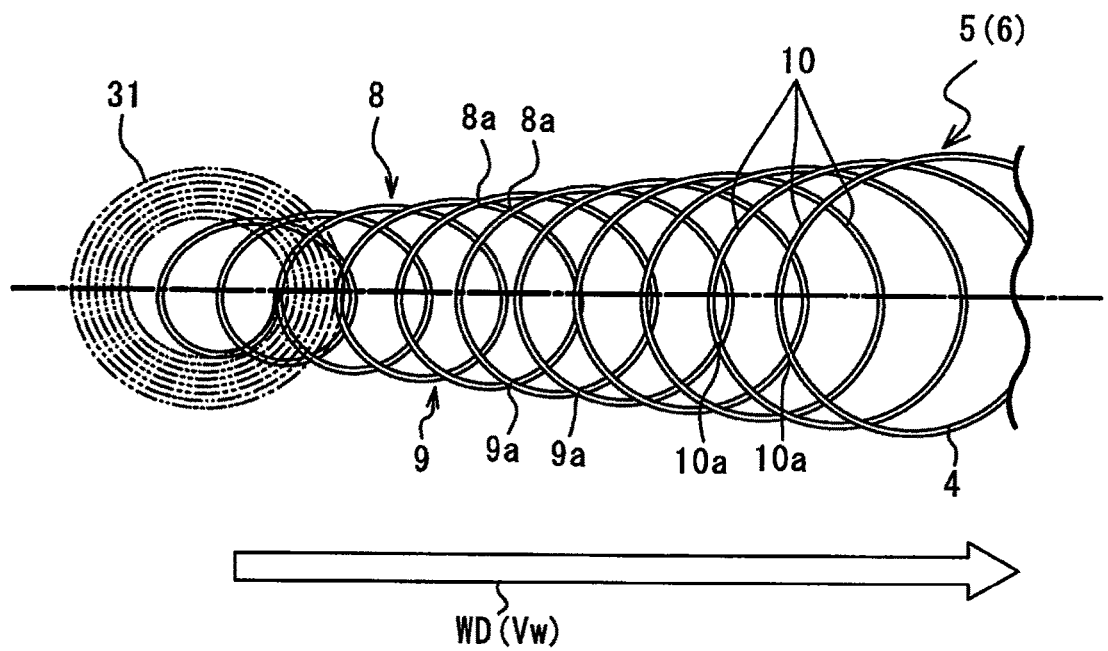
FIG. 8B is a schematic plan view showing an example of a joint portion obtained based on the irradiation pattern shown in FIG. 8A.

The irradiation pattern 31 shown in FIG. 8A has a circular shape, and a radius of the circle gradually increases. As shown in FIG. 8B, in the main body 6 of the joint portion 5 obtained based on this irradiation pattern 31, intersecting portions 10a are formed where the welded portion 4 constituting adjacent connecting portions 10 intersects itself. In other words, in this alternative, a plurality of connecting portions 10 form a network structure. With this irradiation pattern 31, even for the reinforcing material 3 whose width varies in a longitudinal direction, it is possible to form the welded portion 4 by irradiating the entire surface with the laser light 26. In contrast to the case shown in FIG. 8A, the radius of the circular irradiation pattern 31 can be gradually decreased. Further, even with the other irradiation patterns 31 shown in FIG. 9A, FIG. 10A, FIG. 11A, FIG. 12A, FIG. 13A, FIG. 14A, FIG. 15A, and FIG. 16A, a gradual increase or decrease in external dimension allows the entire surface of the reinforcing material 3 whose width varies in the longitudinal direction to be irradiated with the laser light 26.

Figure 9A:
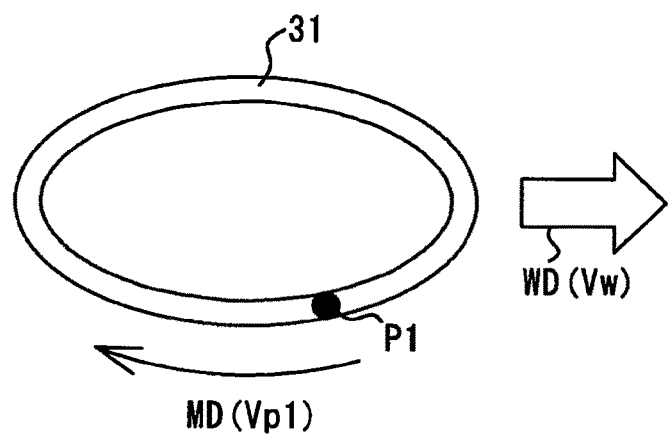
FIG. 9A is a schematic plan view showing a second alternative of the irradiation pattern of laser light.
Figure 9B:
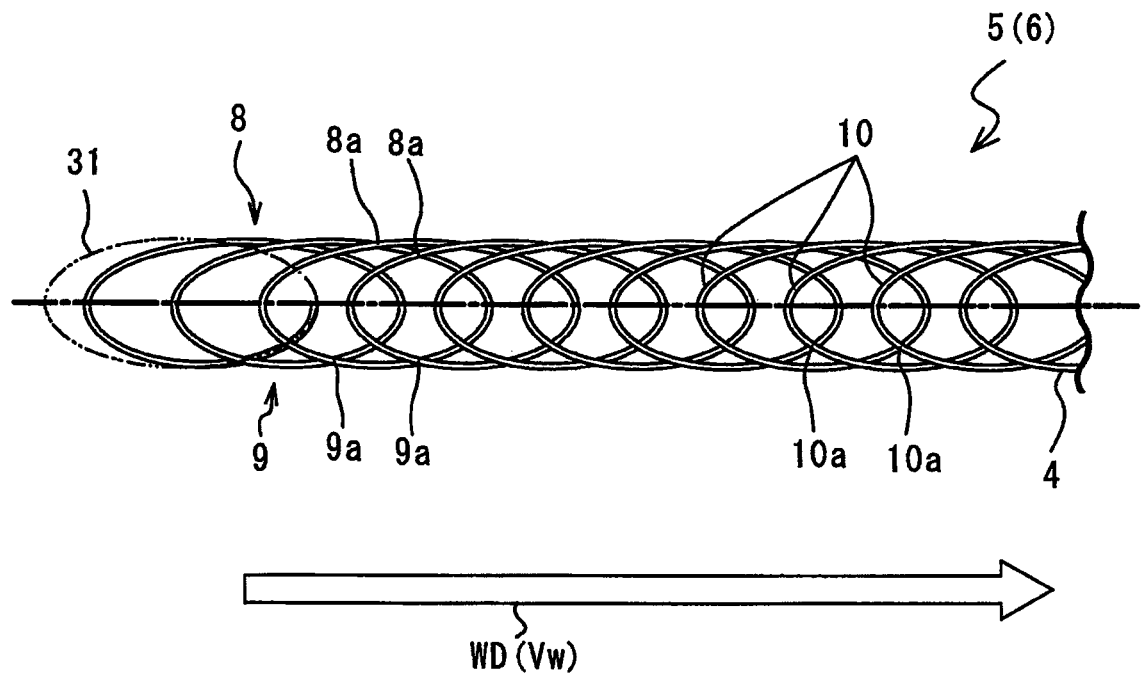
FIG. 9B is a schematic plan view showing an example of a joint portion obtained based on the irradiation pattern shown in FIG. 9A.

The irradiation patterns 31 shown in FIG. 9A has an elliptical shape whose major axis extends in the welding direction WD. As shown in FIG. 9B, in the main body 6 of the joint portion 5 obtained based on this irradiation pattern 31, the intersecting portions 10*a* are also formed where the welded portion 4 constituting adjacent connecting portions 10 intersects itself. In other words, in this alternative, a plurality of connecting portions 10 form a network structure.

Figure 10A:
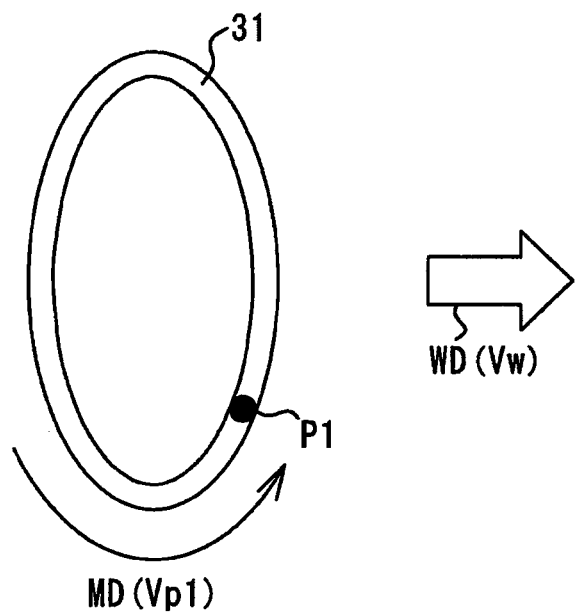
FIG. 10A is a schematic plan view showing a third alternative of the irradiation pattern of laser light.
Figure 10B:
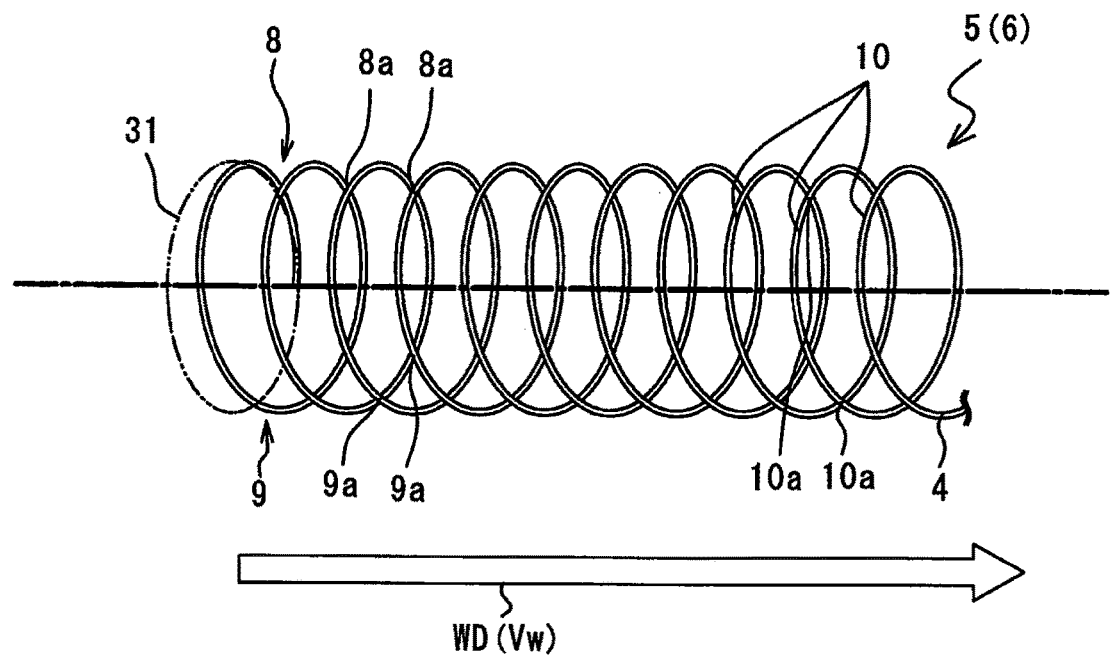
FIG. 10B is a schematic plan view showing an example of a joint portion obtained based on the irradiation pattern shown in FIG. 10A.

The irradiation pattern 31 shown in FIG. 10A has an elliptical shape whose minor axis extends in the welding direction WD. As shown in FIG. 10B, in the main body 6 of the joint portion 5 obtained based on this irradiation pattern 31, the irradiation pattern 31 also has an elliptical shape, but has a plurality of connecting portions 10 arranged in the welding direction WD at intervals closer than the intervals of the irradiation pattern 31 shown in FIG. 9A.

Figure 11A:
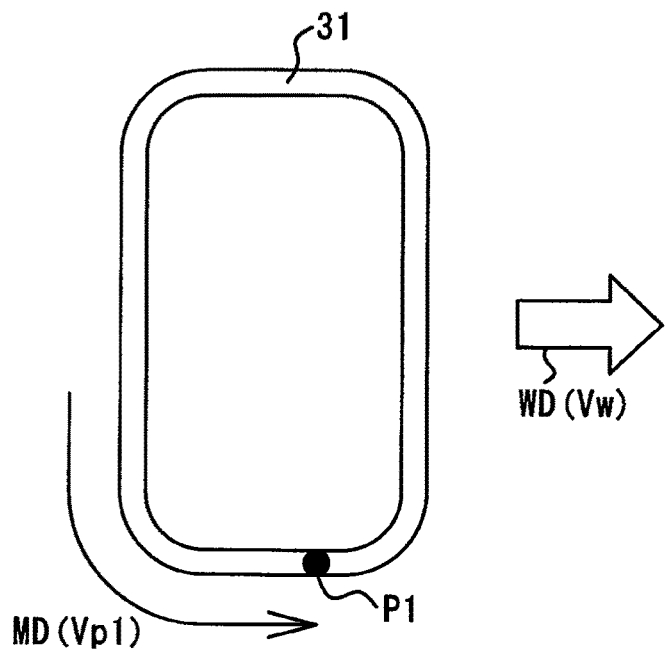
FIG. 11A is a schematic plan view showing a fourth alternative of the irradiation pattern of laser light.
Figure 11B:
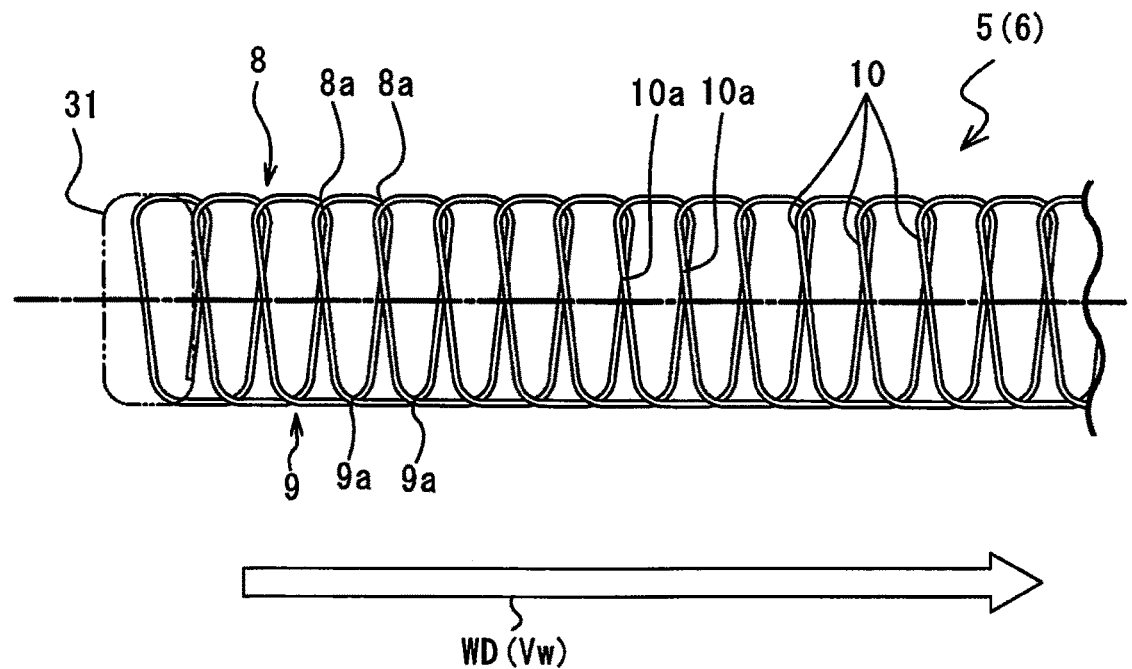
FIG. 11B is a schematic plan view showing an example of a joint portion obtained based on the irradiation pattern shown in FIG. 11A.

The irradiation pattern 31 shown in FIG. 11A has a rectangular shape whose short sides extend in the welding direction WD. As shown in FIG. 11B, in the main body 6 of the joint portion 5 obtained based on this irradiation pattern 31, for example, the first and second longitudinal portions 8, 9 have a shape similar to a geometric straight line as compared with the irradiation pattern 31 (circular) shown in FIG. 6A. Further, each of the connecting portions 10 has a linear shape. Furthermore, the intersecting portions 10*a* are formed where the welded portion 4 constituting adjacent connecting portions 10 intersects itself. That is, even in this alternative, the plurality of connecting portions 10 form a network structure.

Figure 12A:
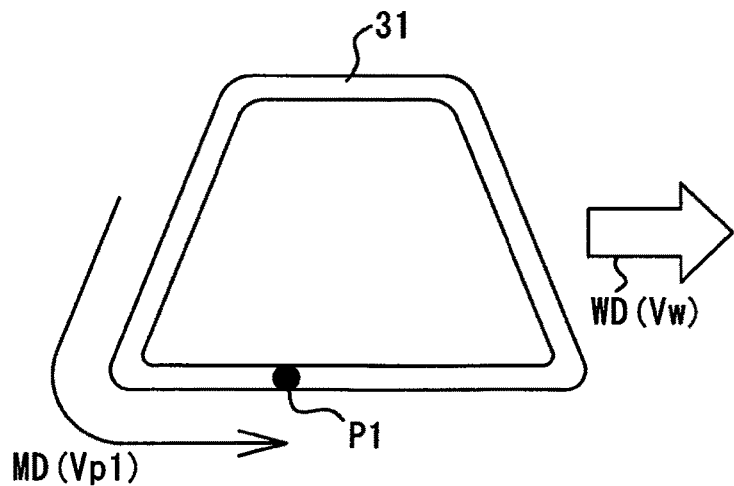
FIG. 12A is a schematic plan view showing a fifth alternative of the irradiation pattern of laser light.
Figure 12B:
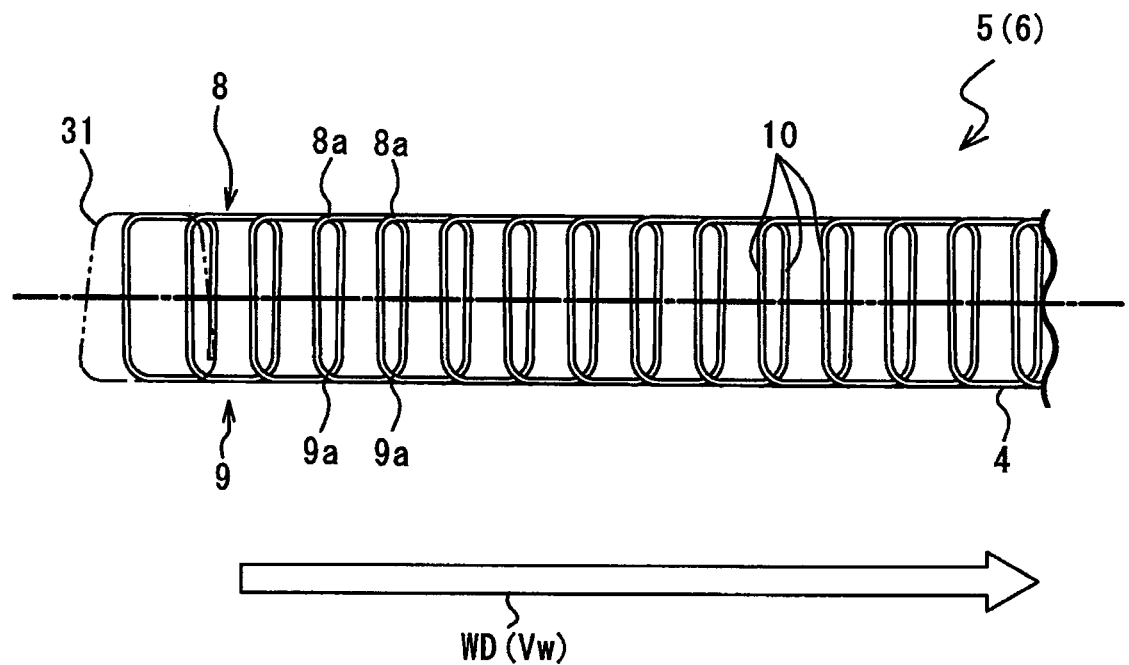
FIG. 12B is a schematic plan view showing an example of a joint portion obtained based on the irradiation pattern shown in FIG. 12A.

The irradiation pattern 31 shown in FIG. 12A has an isosceles trapezoidal shape whose upper base and lower base extend in the welding direction WD. As shown in FIG. 12B, in this alternative, both the speed Vw at which the laser oscillation system 25 moves in the welding direction WD relative to the blank material 2 and the hoop material 20 and the speed Vp1 at which the virtual irradiation position P1 moves on the irradiation pattern 31 are appropriately set, thereby causing the first and second longitudinal portions 8, 9 to linearly extend in the welding direction WD. This further causes the connecting portions 10 to linearly extend in a direction approximately orthogonal to the welding direction WD. The welded portion 4 constituting the connecting portions 10 does not intersect itself, and the main body 6 of the joint portion 5 forms a ladder structure.

Figure 13A:
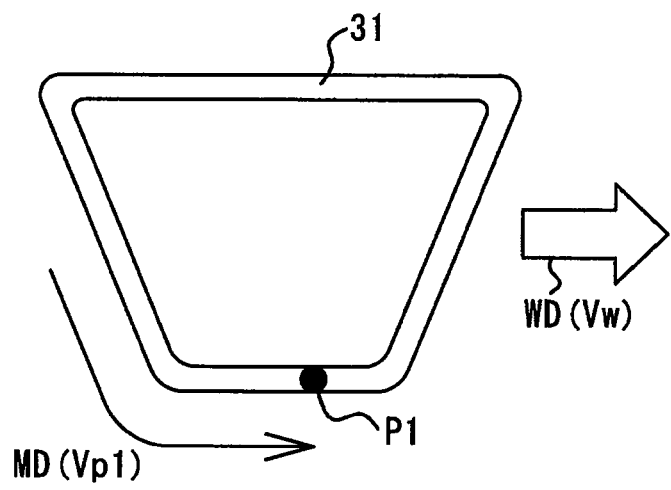
FIG. 13A is a schematic plan view showing a sixth alternative of the irradiation pattern of laser light.
Figure 13B:
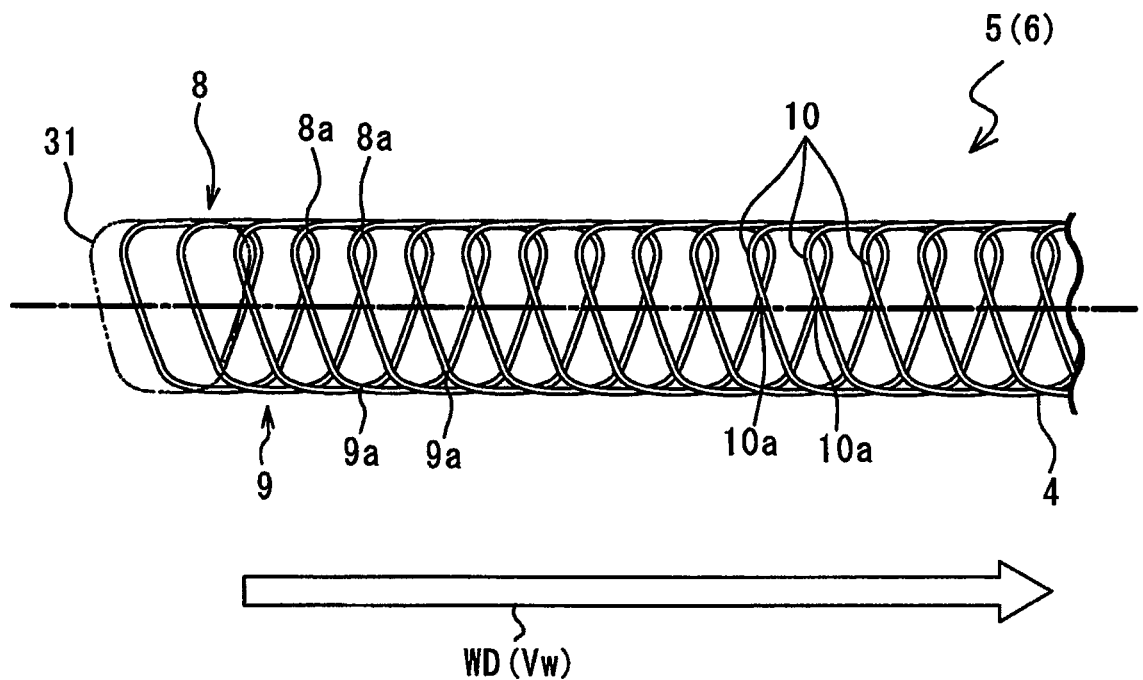
FIG. 13B is a schematic plan view showing an example of a joint portion obtained based on the irradiation pattern shown in FIG. 13A.

The irradiation pattern 31 shown in FIG. 13A has an isosceles trapezoidal shape whose upper base and lower base extend in the welding direction WD, but is a pattern resulting from vertically inverting the irradiation pattern 31 shown in FIG. 12A. As shown in FIG. 13B, in the main body 6 of the joint portion 5 obtained based on this irradiation pattern 31, for example, the first and second longitudinal portions 8, 9 each have a shape similar to a straight line as compared with the irradiation pattern 31 (circular) shown in FIG. 6A. Further, each of the connecting portions 10 has a linear shape. Furthermore, the intersecting portions 10*a* are formed where the welded portion 4 constituting adjacent connecting portions 10 intersects itself. That is, even in this alternative, the plurality of connecting portions 10 form a network structure.

Figure 14A:
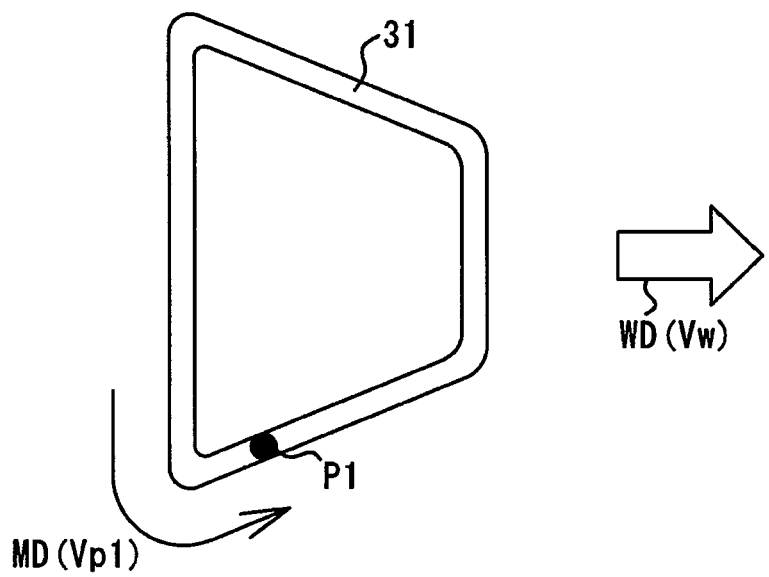
FIG. 14A is a schematic plan view showing a seventh alternative of the irradiation pattern of laser light.
Figure 14B:
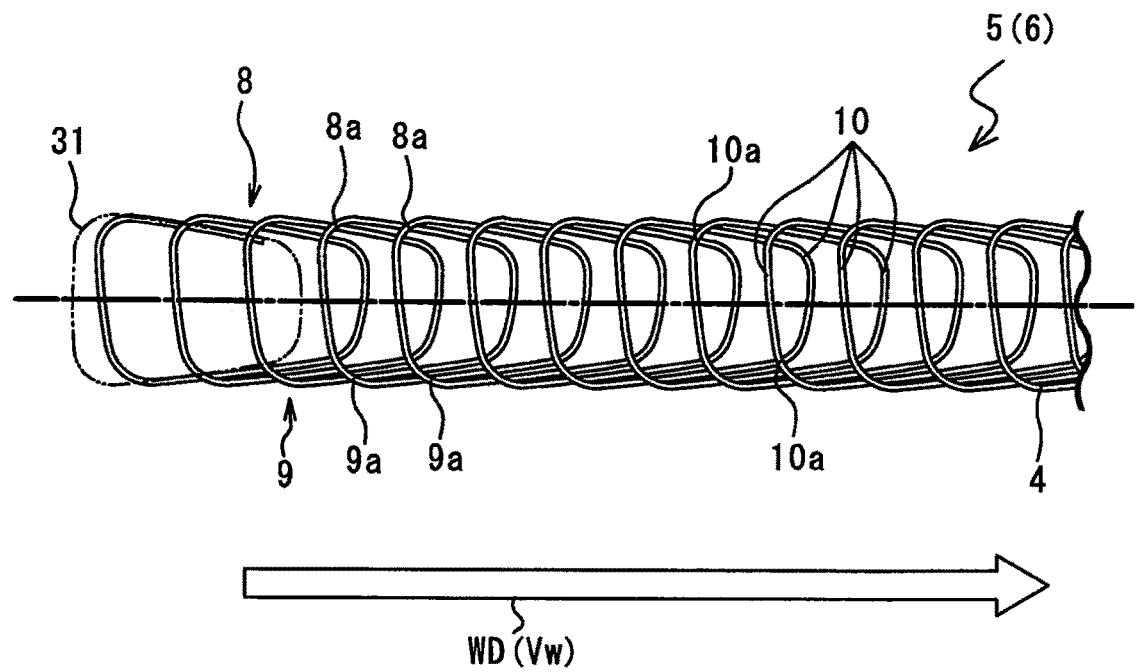
FIG. 14B is a schematic plan view showing an example of a joint portion obtained based on the irradiation pattern shown in FIG. 14A.

The irradiation pattern 31 shown in FIG. 14A has an isosceles trapezoidal shape whose upper base and lower base extend in the direction orthogonal to the welding direction WD, and the upper base is oriented downstream in the welding direction WD. As shown in FIG. 14B, in the main body 6 of the joint portion 5 obtained based on this irradiation pattern 31, each of the connecting portions 10 has an approximately inverted C-shape. Further, the intersecting portions 10*a* are formed where the welded portion 4 constituting adjacent connecting portions 10 intersects itself. That is, even in this alternative, the plurality of connecting portions 10 form a network structure.

Figure 15A:
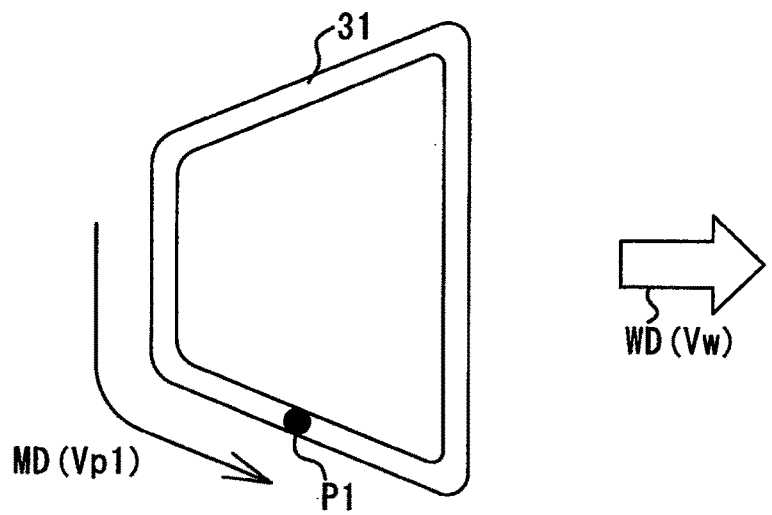
FIG. 15A is a schematic plan view showing an eighth alternative of the irradiation pattern of laser light.
Figure 15B:
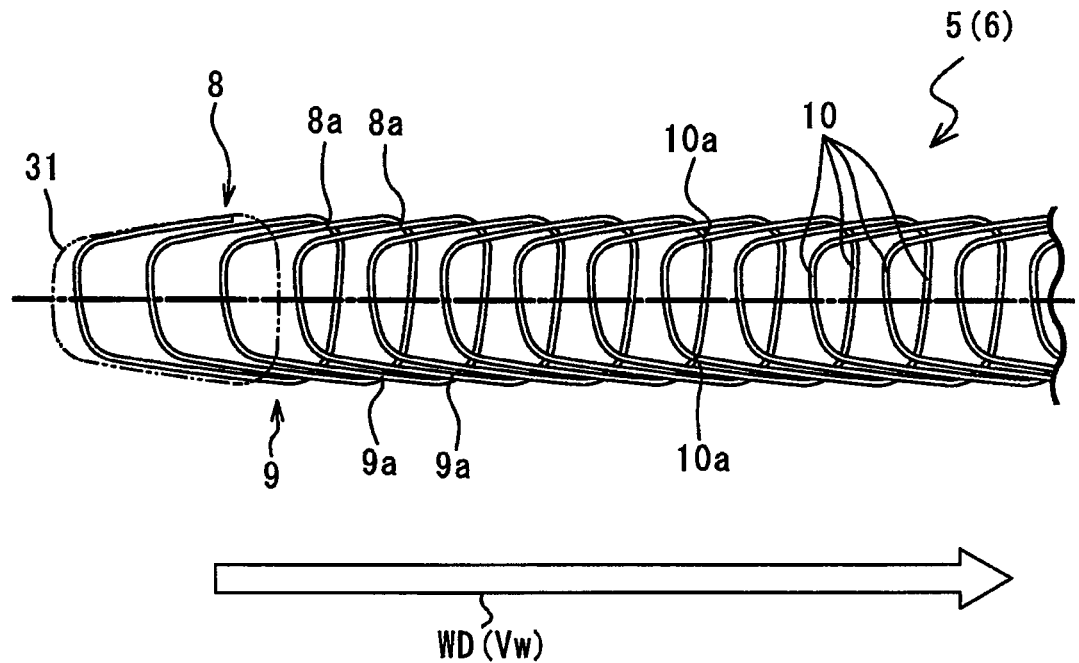
FIG. 15B is a schematic plan view showing an example of a joint portion obtained based on the irradiation pattern shown in FIG. 15A.

The irradiation pattern 31 shown in FIG. 15A has an isosceles trapezoidal shape whose upper base and lower base extend in the direction orthogonal to the welding direction WD, and the lower base is oriented downstream in the welding direction WD. As shown in FIG. 15B, in the main body 6 of the joint portion 5 obtained based on this irradiation pattern 31, each of the connecting portions 10 has an approximately C-shape. Further, the intersecting portions 10*a* are formed where the welded portion 4 constituting adjacent connecting portions 10 intersects itself. That is, even in this alternative, the plurality of connecting portions 10 form a network structure.

Figure 16A:
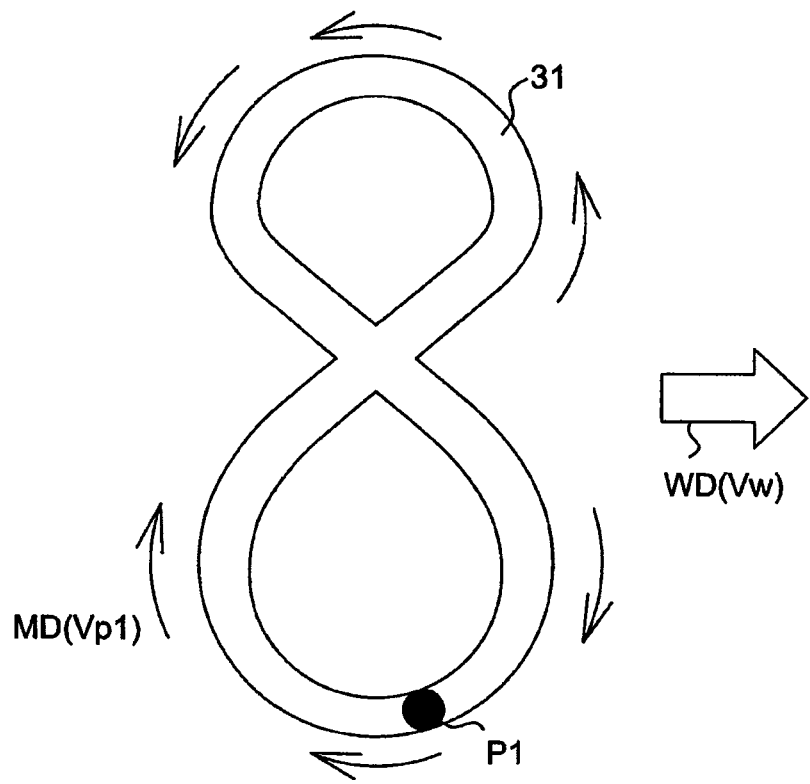
FIG. 16A is a schematic plan view showing a ninth alternative of the irradiation pattern of laser light.
Figure 16B:
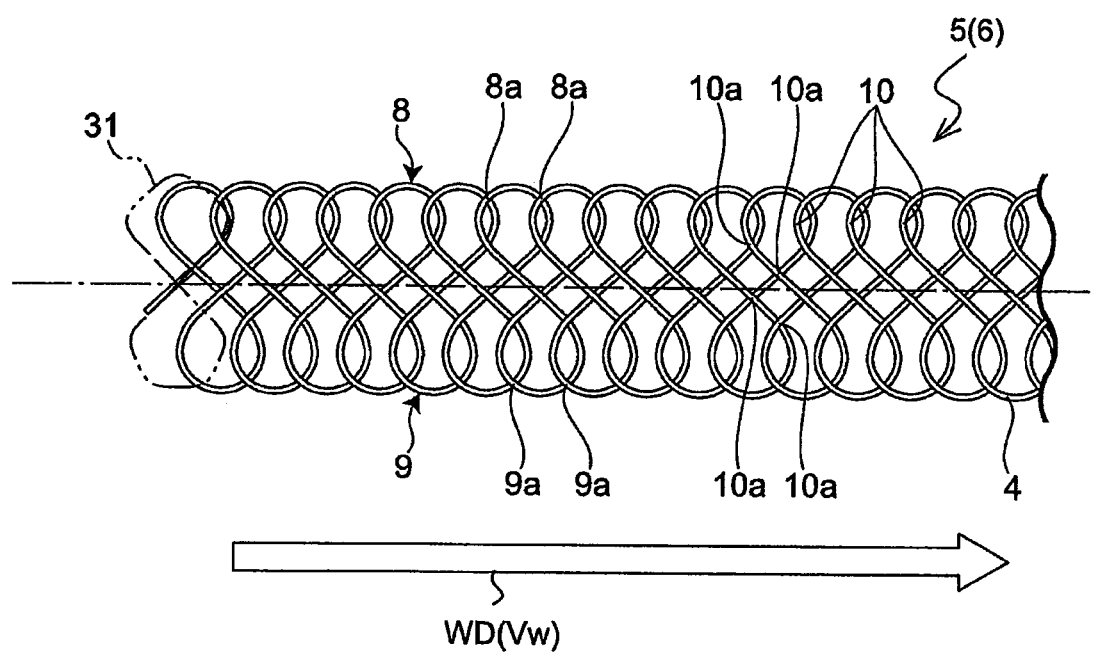
FIG. 16B is a schematic plan view showing an example of a joint portion obtained based on the irradiation pattern shown in FIG. 16A.

The irradiation pattern 31 shown in FIG. 16A has a figure eight shape. As shown in FIG. 16B, in the main body 6 of the joint portion 5 obtained based on this irradiation pattern 31, each of the connecting portions 10 includes curved ends connected to the first and second longitudinal portions 8, 9, and a center portion has an approximately linear shape. Further, the intersecting portions 10*a* are formed where the welded portion 4 constituting adjacent connecting portions 10 intersects itself. That is, even in this alternative, the plurality of connecting portions 10 form a network structure. An outer circumferential portion of the figure eight shape may have an elliptical shape.

The effects of the above-described manufacturing method for the joint body 1 will be described below.

According to the above-described manufacturing method for the joint body 1, the blank material 2 and the hoop material 20 are joined together by laser welding with the predetermined gap d (see FIG. 5) provided in a thickness direction, thereby allowing the component-evaporated gas generated from the plated layer to be released through the gap d. At this time, since the blank material 2 is supplied to form the predetermined gap d between the blank material 2 and the hoop material 20, it is not necessary to apply special processing such as embossing to form a gap when the blank material 2 and the hoop material 20 are placed on top of each other in a conventional manner. Therefore, it is possible to prevent the occurrence of a blowhole by a simple method without increasing the number of processes and in turn makes it possible to prevent the occurrence of a defect in the joint body 1.

Further, according to the above-described manufacturing method for the joint body 1, since the hoop material 20 is supplied while being pressed against the blank material 2 obliquely from above at the predetermined angle, it is possible to weld the blank material 2 and the hoop material 20 together with predetermined flatness maintained even when the hoop material 20 is deformed by welding heat. Further, since the blank material 2 and the hoop material 20 are not in contact with each other on the supply near side (right side in FIG. 5) of the hoop material 20 relative to the contact point Pc between the blank material 2 and the hoop material 20, a gap is formed between the blank material 2 and the hoop material 20 without exception. Therefore, the laser is projected onto the supply near side of the hoop material 20 relative to the contact point Pc between the blank material 2 and the hoop material 20, thereby allowing the blank material 2 and the hoop material 20 to be joined together by laser welding with the predetermined gap d provided in the thickness direction as described above.

Herein, the predetermined angle is an angle that allows the predetermined flatness to be maintained by pressing the hoop material 20 against the blank material 2 obliquely from above and an angle that makes it less difficult to maintain the predetermined gap d. The predetermined angle satisfying the conditions is preferably in a range of about 2 degrees to 20 degrees. Further, the predetermined angle is determined in a manner that depends on the predetermined gap d and is thus not determined independently. In other words, it is necessary that a triangular shape having a line segment connecting the point P0 and the point Pc as a hypotenuse and a line segment of the gap d as a height can achieve the above conditions. For example, when the predetermined gap d is about 0.2 mm as in the present embodiment, the predetermined angle is about 5 degrees.

Figure 17:
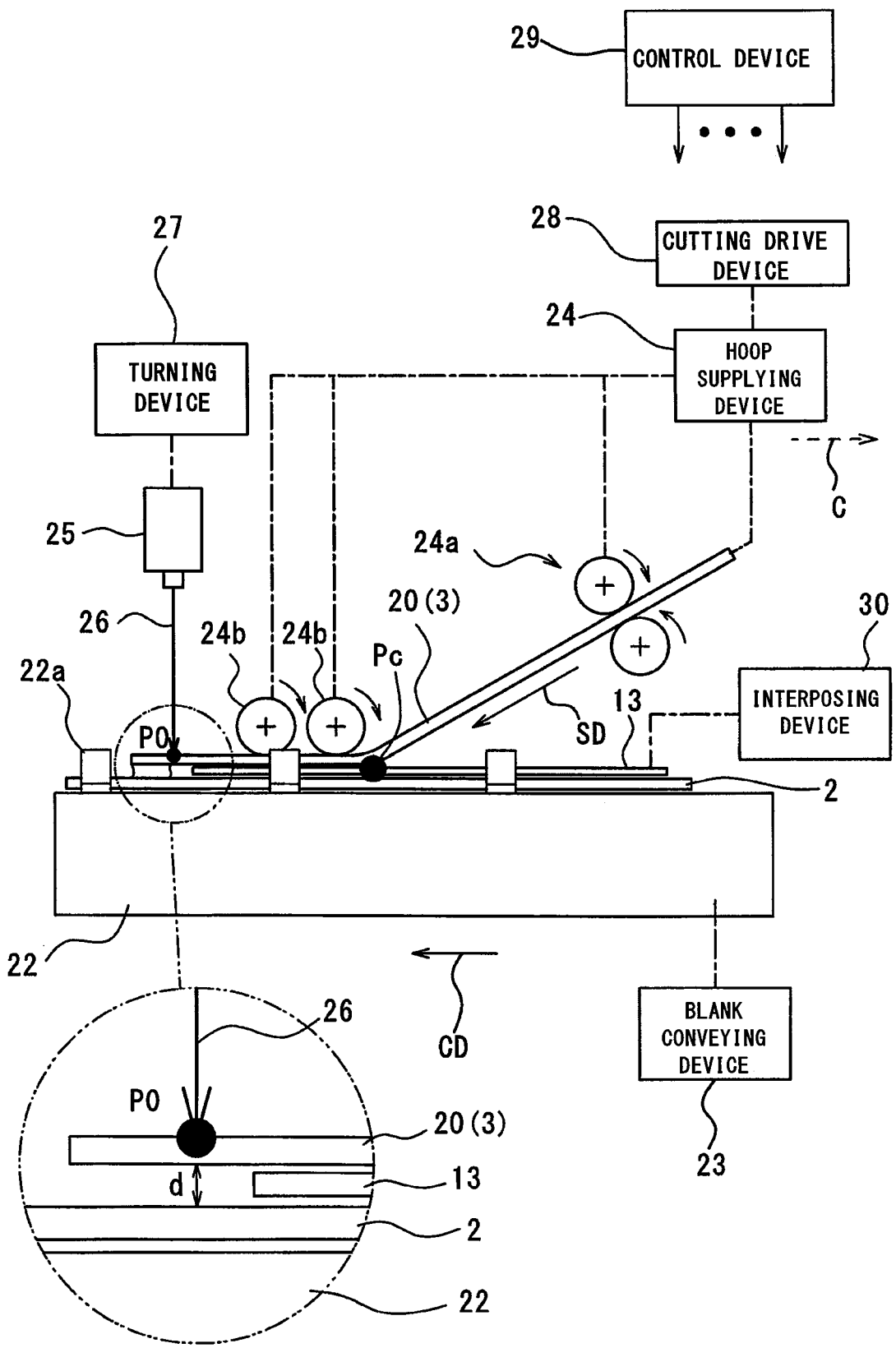
FIG. 17 is a schematic side view of a modification of the manufacturing apparatus shown in FIG. 5.

FIG. 17 shows a modification of the manufacturing apparatus 21 of the present embodiment corresponding to FIG. 5.

In the present modification, in addition to the components of the above-described manufacturing apparatus 21 (see FIG. 5), a holding roller 24b and an interposing device 30 are provided.

The holding roller 24b is a part of the hoop supplying device 24 and is disposed on the supply near side (right side in FIG. 17) of the hoop material 20 relative to the laser irradiation position P0. In the present modification, two holding rollers 24b are arranged. The holding roller 24b holds the blank material 2, the hoop material 20, and a spacer 13 to be described later downward and thus contributes to maintaining the flatness of the manufactured joint body 1.

In the present modification, the laser light 26 is projected onto the hoop material 20 on the forward (supply forward) side where the hoop material 20 comes into contact with the blank material 2, that is, on the left side in FIG. 5 relative to the contact point Pc. Herein, the contact point Pc is a point where the blank material 2, the hoop material 20, and the spacer 13 are in contact with each other.

The interposing device 30 is configured to interpose the spacer 13 between the blank material 2 and the hoop material 20 to form the predetermined gap d between the blank material 2 and the hoop material 20 at the laser irradiation position P0. The spacer 13 is equivalent in thickness to the predetermined gap d. A material of the spacer 13 is not limited to a specific material but is a material having resistance to heat generated by laser welding. Therefore, in the present embodiment, the spacer 13 is a steel plate having a thickness of about 0.2 mm, for example. Specifically, the interposing device 30 is a device that fixes the position of the spacer 13. Since the blank material 2 and the hoop material 20 are moved in the conveying direction CD as described above, the spacer 13 interposed between the blank material 2 and the hoop material 20 is also moved in the conveying direction CD when the spacer 13 is not fixed. When the spacer 13 is moved in the conveying direction CD, the spacer 13 reaches the laser irradiation position P0, preventing the predetermined gap d from being maintained at the laser irradiation position P0. Therefore, in order to prevent this problem, the position of the spacer is fixed by the interposing device 30 in the present modification. As described above, the laser is projected onto the hoop material 20 with the predetermined gap d between the blank material 2 and the hoop material 20 maintained at the laser irradiation position P0 by the spacer 13. On the forward side relative to the laser irradiation position P0, a slight gap between the blank material 2 and the hoop material 20 formed by the spacer 13 is filled with a hardened weld pool, thereby joining the blank material 2 and the hoop material 20.

According to the present modification, it is possible to provide the predetermined gap between the blank material 2 and the hoop material 20 at the laser irradiation position P0 using the spacer 13, that is, it is possible to provide a gap (gas discharge path) through which the component-evaporated gas is released. Furthermore, the spacer 13 may be narrower than the hoop material 20 so as not to block the gas discharge path through which the component-evaporated gas is released, or a slit (not shown) extending in the conveying direction CD may be provided in the spacer 13, the slit serving as the gas discharge path in the spacer 13. Further, the interposing device 30 may form the gas discharge path by pulling out the spacer 13 in a direction opposite to the conveying direction CD as necessary.

Regarding the manufacturing apparatus 21 according to second and third embodiments to be described below, a structure or function of which no specific description will be given is the same as the structure or function according to the first embodiment. In the drawings relating to these embodiments, the same or similar elements are denoted by the same symbols.

Second Embodiment

Figure 18:
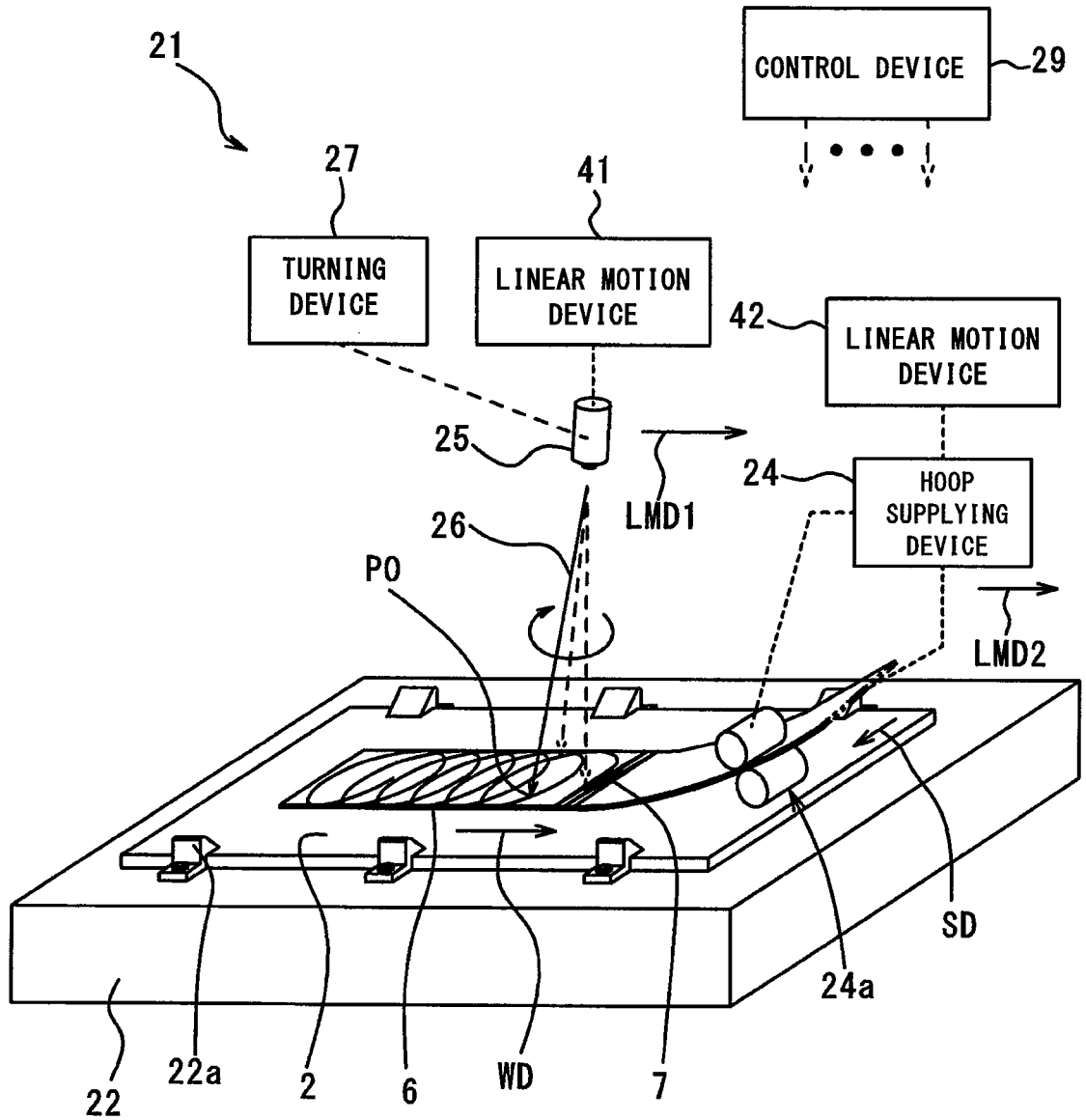
FIG. 18 is a schematic perspective view of a manufacturing apparatus for a joint body according to a second embodiment of the present invention.

FIG. 18 shows a manufacturing apparatus 21 for a joint body according to the second embodiment of the present invention.

The manufacturing apparatus 21 does not include the blank conveying device 23 (see FIG. 1 and FIG. 2), and the table 22 and the blank material 2 held on the table 22 are fixed. The manufacturing apparatus 21 includes a linear motion device 41 that linearly moves the laser oscillation system 25 in the welding direction WD (indicated by an arrow LMD1), and a linear motion device 42 that linearly moves, in a similar manner, the hoop supplying device 24 in the welding direction WD (indicated by an arrow LMD2). In the present embodiment, the linear motion devices 41, 42 and the turning device 27 serve as the irradiation position motion unit according to the present invention.

The hoop material 20 is continuously supplied by the hoop supplying device 24 from obliquely above the blank material 2. The laser oscillation system 25 and the hoop supplying device 24 move in the welding direction WD at a speed synchronized with the supplying speed of the hoop material 20. Further, the irradiation direction of the laser light 26 emitted from the laser oscillation system 25 is changed by the turning device 27 such that the virtual irradiation position P1 moves along a specific irradiation pattern 31 (see FIG. 6A, FIG. 8A, FIG. 9A, FIG. 10A, FIG. 11A, FIG. 12A, FIG. 13A, FIG. 14A, FIG. 15A, and FIG. 16A). Through the above processes, the joint portion 5 is formed based on the irradiation pattern 31 (see FIG. 6B, FIG. 8B, FIG. 9B, FIG. 10B, FIG. 11B, FIG. 12B, FIG. 13B, FIG. 14B, FIG. 15B, and FIG. 16B). Note that the linear motion device 42 applies, after the formation of the end portion 7 of the joint portion 5, tension to the hoop material 20 to cut the hoop material 20.

In particular, as in the first embodiment, at the laser irradiation position P0, the laser is projected onto the supply near side of the hoop material 20 relative to the contact point Pc between the blank material 2 and the hoop material 20 (see FIG. 5), thereby allowing the blank material 2 and the hoop material 20 to be joined together by laser welding with the predetermined gap d provided in the thickness direction as described above.

Further, as in the modification of the first embodiment (see FIG. 17), when the spacer 13 is interposed between the blank material 2 and the hoop material 30 by the interposing device 30, the spacer 13 is also moved by the interposing device 30 in the welding direction WD at the same speed as the laser oscillation system 25 and the hoop supplying device 24. This allows the predetermined gap to be maintained between the blank material 2 and the hoop material 20 at the laser irradiation position P0.

Third Embodiment

Figure 19:
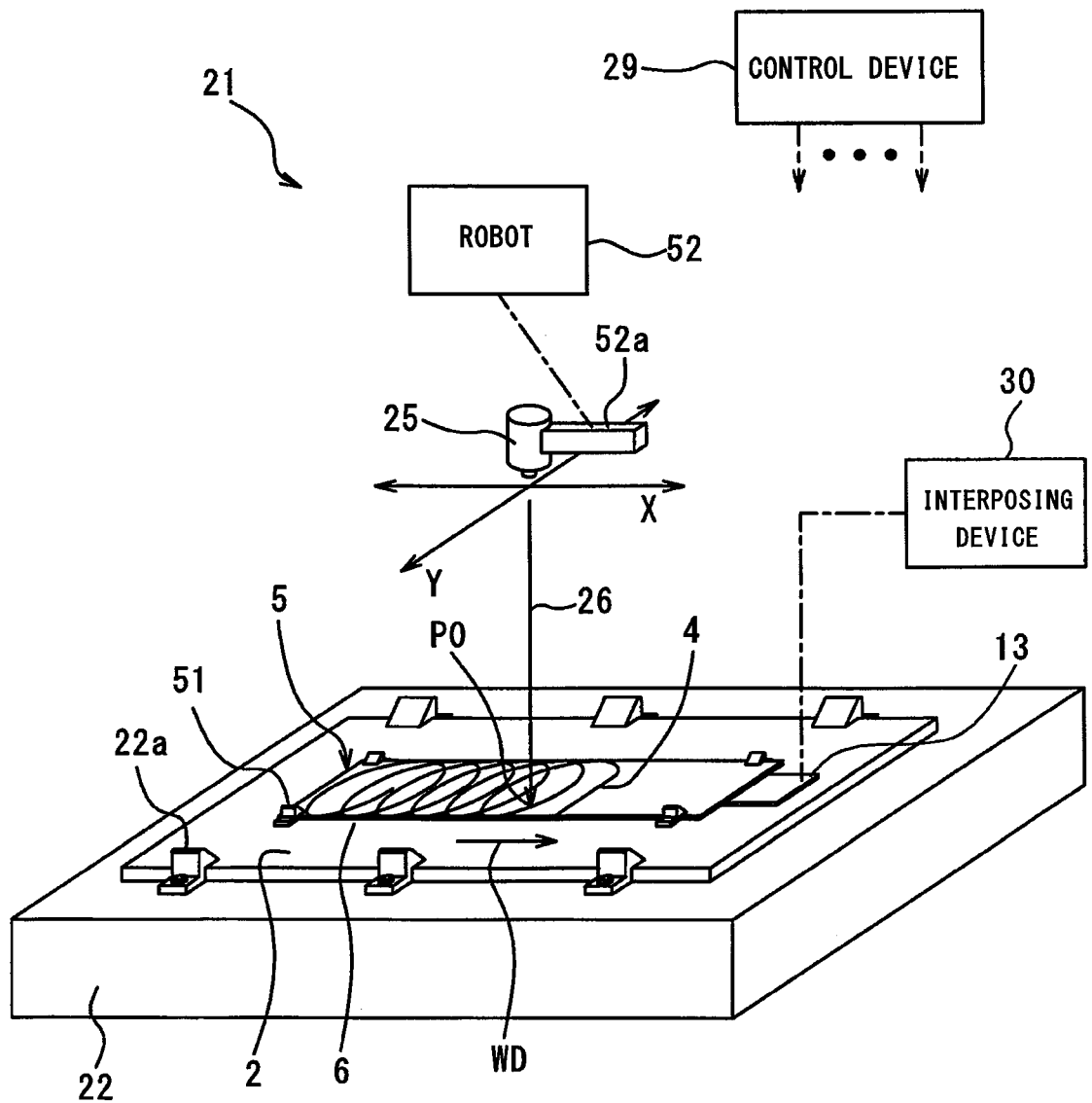
FIG. 19 is a schematic perspective view of a manufacturing apparatus for a joint body according to a third embodiment of the present invention.

FIG. 19 shows a manufacturing apparatus 21 for a joint body according to the third embodiment of the present invention.

The manufacturing apparatus 21 does not include the blank conveying device 23 (see FIG. 1 and FIG. 2), and the table 22 and the blank material 2 held on the table 22 are fixed. Further, the manufacturing apparatus 21 does not include the hoop supplying device 24 (see FIG. 1 and FIG. 2), and the reinforcing material 3 that has been cut out is temporarily fixed to the blank material 2 by a fixture 51. The reinforcing material 3 that has been cut out may be temporarily fixed to the blank material 2 by spot welding or laser spot welding. The laser oscillation system 25 is fixedly held by a robot arm 52a included in a robot 52 such that the laser light 26 is projected downward. In particular, according to the present embodiment, the manufacturing apparatus 21 does not include the turning device 27 (see FIG. 1 and FIG. 2), and the irradiation direction of the laser light 26 is constant. In the present embodiment, the robot arm 52a serves as the irradiation position motion unit according to the present invention.

The robot arm 52a moves the laser oscillation system 25 in two directions in a horizontal plane, that is, in an X direction and Y direction, such that the irradiation position P0 moves along a desired main body 6 of the joint portion 5 (see FIG. 6B, FIG. 8B, FIG. 9B, FIG. 10B, FIG. 11B, FIG. 12B, FIG. 13B, FIG. 14B, FIG. 15B, and FIG. 16B).

In the present embodiment, since the reinforcing material 3 that has been cut out is temporarily fixed to the blank material 2 by the fixture 51, unlike the first and second embodiments, the hoop material 20 is not supplied while being pressed against the blank material 2 obliquely from above at the predetermined angle. Therefore, in order to provide the predetermined gap between the blank material 2 and the hoop material 20 at the laser irradiation position P0, as in the modification of the first embodiment (see FIG. 17), the spacer 13 is interposed between the blank material 2 and the hoop material 20. The spacer 13 is moved by the interposing device 30 in sync with the movement of the laser oscillation system 25 in the X direction. This allows the predetermined gap to be maintained at the laser irradiation position P0.

Figure 20:
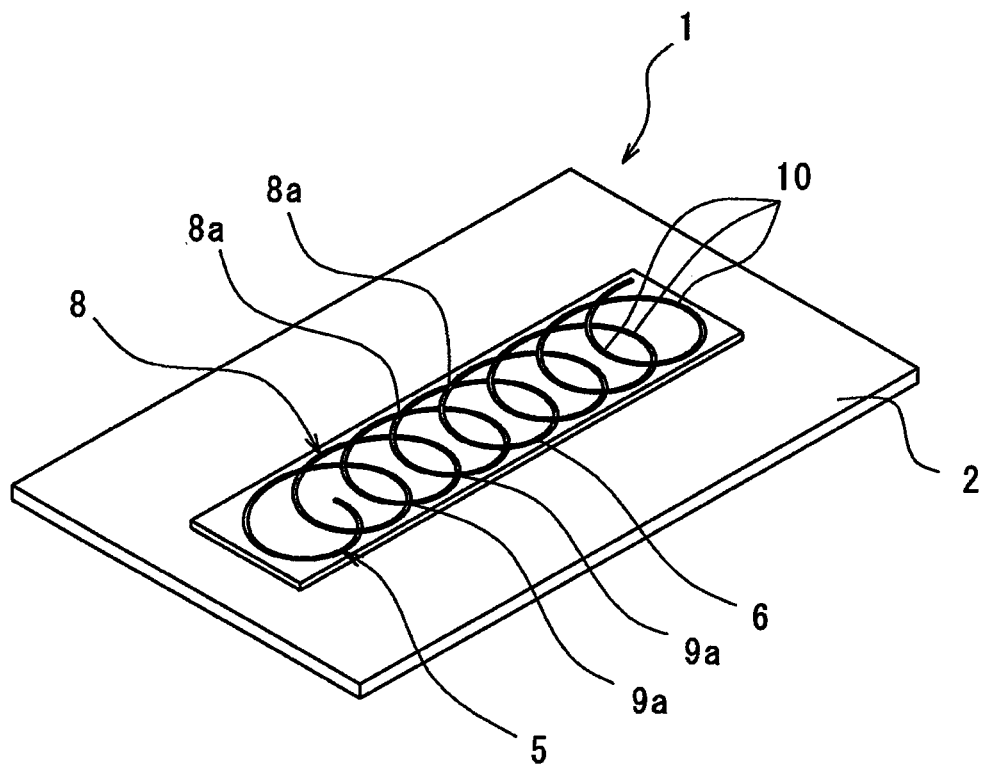
FIG. 20 is a perspective view of an example of a joint body manufactured by the manufacturing apparatus according to the third embodiment of the present invention.

FIG. 20 shows the joint body 1 manufactured by the manufacturing apparatus 21 according to the present embodiment. Since the reinforcing material 3 that has been cut out is used rather than applying tension to the hoop material 20 to cut the hoop material 20, the joint portion 5 of the joint body 1 includes only the main body 6 without the end portion 7. Similarly, even when the joint body 1 is manufactured by the manufacturing apparatus 21 according to the first embodiment (FIG. 4 and FIG. 5) and the manufacturing apparatus according to the second embodiment (FIG. 18), a configuration where the reinforcing material 3 that has been cut out rather than the hoop material 20 that is continuously supplied is joined to the blank material 2 allows the joint portion 5 to include only the main body 6 without the end portion 7.

Figure 21:
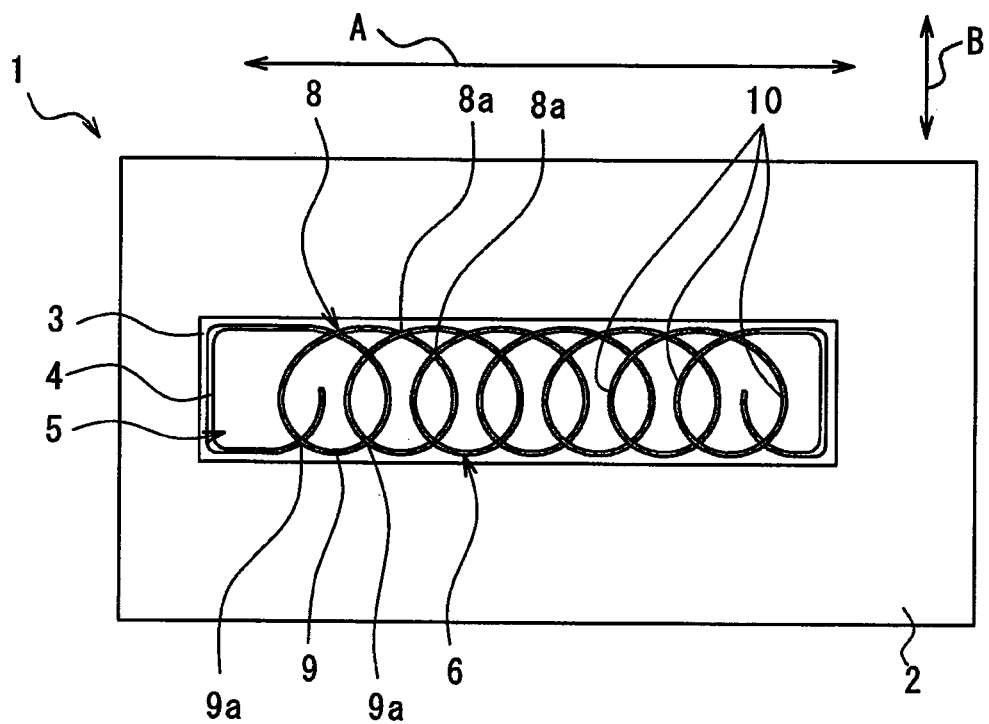
FIG. 21 is a plan view showing an alternative of the joint body.

FIG. 21 shows an alternative of the joint body 1. In this alternative, the joint portion 5 is formed, based on the irradiation pattern 31 shown in FIG. 12A, at both ends of the reinforcing material 3, and the joint portion 5 is formed, based on the irradiation pattern 31 shown in FIG. 9A, at portions other than both the ends of the reinforcing material 3. This causes the joint portion 5 to have, at both the ends of the reinforcing material 3, the same shape as shown in FIG. 12B and to have, at the portions other than both the ends of the reinforcing material 3, the same shape as shown in FIG. 9B. The irradiation pattern 31 shown in FIG. 12A is applied to both the ends of the reinforcing material 3 to provide the welded portion 4 at the corners of the reinforcing material 3, thereby further increasing the joint strength of the reinforcing material 3 to the blank material 2. At least any two of the irradiation patterns 31 shown in FIG. 6A, FIG. 8A, FIG. 9A, FIG. 10A, FIG. 11A, FIG. 12A, FIG. 13A, FIG. 14A, FIG. 15A, and FIG. 16A may be used in combination.

The invention claimed is:

1. A manufacturing method for a joint body having a first metal member plated with a metal material and a second metal member plated with a metal material joined together by placing the second metal member over the first metal member and causing a laser oscillation system to irradiate a first surface of the second metal member with laser light to form a joint portion including a line-shaped welded portion where the first metal member and the second metal member are joined together, the manufacturing method comprising:

placing the first metal member on a support table having a first metal member fixture in such a manner that the first metal member is fixed onto the support table by direct engagement between the first metal member and the first metal member fixture, and the second metal member is not attached to the first metal member or directly engaged with any fixture fixed onto the support table, including the first metal member fixture;

supplying the second metal member between a pair of rollers to place the second metal member over the first metal member and forming a predetermined gap between the first metal member and the second metal member, the pair of rollers being remote from the first metal member, the pair of rollers being disposed directly opposite each other and separated only by a thickness of the second metal member;

pressing the second metal member against the first metal member obliquely from above using the pair of rollers with no relative movement of the second metal member to the first metal member in an in-plane direction of the first metal member; and irradiating the second metal member with the laser oscillation system at a position where the predetermined gap is located between the first metal member and the second metal member to join the first metal member and the second metal member together by laser welding;

wherein the second metal member is pressed against the first metal member only by the pair of rollers;

wherein the supplying and pressing steps include contacting a first roller of the pair of rollers against the first surface of the second metal member and contacting a second roller of the pair of rollers against a second surface of the second metal member opposite the first surface of the second metal member; and wherein the entirety of the first surface of the second metal member is accessible to the laser light to form the joint portion after the supplying step and prior to the irradiating step.

2. The manufacturing method for a joint body according to claim 1, wherein when the second metal member is supplied toward the first metal member, the second metal member is supplied successively onto the first metal member at a predetermined angle to come into contact with the first metal member from a supply forward side to a near side, and during the laser welding, the laser is projected onto the second metal member on the near side of where the second metal member comes into contact with the first metal member.

3. The manufacturing method for a joint body according to claim 1, wherein the second metal member is supplied with a spacer interposed between the first metal member and the second metal member, and the laser is irradiated onto the second metal member with the predetermined gap maintained between the first metal member and the second metal member by the spacer at a laser irradiation position.

4. A manufacturing apparatus for a joint body having a first metal member plated with a metal material and a second metal member plated with a metal material joined together by placing the second metal member over the first metal member and causing a laser oscillation system to irradiate a first surface of the second metal member with laser light to form a joint portion including a line-shaped welded portion where the first metal member and the second metal member are joined together, the manufacturing apparatus comprising:

a support table having a first metal member fixture configured to directly engage with the first metal member and hold the first metal member onto the support table, wherein the second metal member is not attached to the first metal member or directly engaged with any fixture fixed onto the support table, including the first metal member fixture;

a supplying unit having a pair of supplying rollers including a first roller arranged to contact the first surface of the second metal member and a second roller arranged to contact a second surface of the second metal member opposite the first surface of the second metal member, the pair of rollers configured to successively supply the second metal member between the pair of supplying rollers and press the second metal member against the first metal member held on the support table obliquely from above at a predetermined angle with no relative movement of the second metal member to the first metal member in an in-plane direction of the first metal member;

the laser oscillation system configured to emit laser light to weld the first metal member and the second metal member together; and an irradiation position motion unit configured to cause the laser oscillation system to irradiate the second metal member with the laser oscillation system at a position where a gap is formed between the first metal member and the second metal member;

wherein the pair of rollers are remote from the first metal member, and are disposed directly opposite each other and configured to be separated only by the second metal member;

wherein the second metal member is pressed against the first metal member only by the pair of supplying rollers; and wherein the entirety of the first surface of the second metal member is accessible to the laser light to form the joint portion after the supplying unit presses the second metal member against the first metal member and prior to the laser oscillation system irradiating the second metal member.

* * * * *